(12) United States Patent
Niwa et al.

(10) Patent No.: US 6,768,095 B2
(45) Date of Patent: Jul. 27, 2004

(54) NEAR-FIELD OPTICAL PROBE HAVING CANTILEVER AND PROBE FORMED OF TRANSPARENT MATERIAL, METHOD FOR MANUFACTURING NEAR-FIELD OPTICAL PROBE, AND OPTICAL APPARATUS HAVING NEAR-FIELD OPTICAL PROBE

(75) Inventors: Takashi Niwa, Chiba (JP); Kenji Kato, Chiba (JP); Nobuyuki Kasama, Chiba (JP); Manabu Oumi, Ciba (JP); Yasuyuki Mitsuoka, Chiba (JP); Susumu Ichihara, Chiba (JP)

(73) Assignee: Seiko Instruments R & D Center Inc., Chiba (JP)

( * ) Notice: Subject to any disclaimer, the term of this patent is extended or adjusted under 35 U.S.C. 154(b) by 212 days.

(21) Appl. No.: 09/740,664

(22) Filed: Dec. 19, 2000

(65) Prior Publication Data

US 2001/0011704 A1 Aug. 9, 2001

(30) Foreign Application Priority Data

Nov. 20, 2000 (JP) ........................................ 2000-352778

(51) Int. Cl.$^7$ ................................................ H01J 5/16
(52) U.S. Cl. ........................................ 250/216; 73/105
(58) Field of Search ............................... 250/216, 234, 250/306–311; 73/105

(56) References Cited

U.S. PATENT DOCUMENTS

| | | | |
|---|---|---|---|
| 5,289,004 A | * 2/1994 | Okada et al. ................ 250/306 |
| 5,294,790 A | 3/1994 | Ohta et al. ................... 250/216 |
| 5,354,985 A | 10/1994 | Quate ........................... 250/234 |
| 5,479,024 A | * 12/1995 | Hillner et al. ............ 250/458.1 |
| 5,489,774 A | 2/1996 | Akamine et al. ............ 250/234 |
| 5,581,083 A | * 12/1996 | Majumdar et al. .......... 250/306 |
| 5,633,455 A | * 5/1997 | Quate ............................ 73/105 |
| 5,675,532 A | * 10/1997 | Gemma et al. ............. 365/151 |
| 5,767,891 A | * 6/1998 | Hirokane et al. ............ 347/258 |
| 5,838,005 A | 11/1998 | Majumdar et al. .......... 250/306 |
| 6,046,972 A | 4/2000 | Kuroda et al. .............. 369/126 |
| 6,335,522 B1 | * 1/2002 | Shimada et al. .......... 250/201.3 |

FOREIGN PATENT DOCUMENTS

| | | |
|---|---|---|
| EP | 0846932 | 6/1998 |
| EP | 0880043 | 11/1998 |
| EP | 0964251 | 12/1999 |

* cited by examiner

Primary Examiner—Thanh X. Luu
(74) Attorney, Agent, or Firm—Adams & Wilks

(57) ABSTRACT

A near-field optical probe has a cantilever formed of a transparent material and having a first main surface and a second main surface opposite the first main surface. A base supports the cantilever at the first main surface. A tip extends from the second main surface of the cantilever and has a microscopic aperture at an end thereof. The tip is formed of a transparent material having a higher refractive index than that of the transparent material of the cantilever to increase an amount of near-field light generated or detected by the microscopic aperture. A shade film is formed on the second main surface of the cantilever and on a surface of the tip except for the microscopic aperture.

11 Claims, 18 Drawing Sheets

PRIOR ART

NEAR-FIELD OPTICAL PROBE HAVING CANTILEVER AND PROBE FORMED OF TRANSPARENT MATERIAL, METHOD FOR MANUFACTURING NEAR-FIELD OPTICAL PROBE, AND OPTICAL APPARATUS HAVING NEAR-FIELD OPTICAL PROBE

BACKGROUND OF THE INVENTION

This invention relates to a near-field optical probe for observing, measuring and forming optical characteristics in a microscopic region of a sample, and a manufacturing method for the same.

At present, in the scanning near-field microscope (hereinafter, abbreviated as SNOM), an optical medium having a microscopic aperture in a sharpened tip is used as a probe. The tip and microscopic aperture is approached to a measured sample to a distance of less than a wavelength of light to measure an optical characteristic and shape of the sample with resolution. In this apparatus, a linear optical fiber probe vertically held to a sample at a tip is horizontally vibrated with respect to a sample surface. The detection of change in vibration amplitude caused by a shearing force acting between the sample surface and the probe tip is made by illuminating laser light to the probe tip and detecting a change of a shade thereof. The distance between the probe tip and the sample surface is held constant by moving the sample by a fine movement mechanism in a manner of making amplitude constant. From a signal intensity inputted to the fine movement mechanism, a surface shape is detected and a sample optical characteristic is measured. Such apparatus is proposed.

A scanning-type near-field atomic microscope has also been proposed which uses an optical fiber probe formed in a hook form as a cantilever for an atomic force microscope (hereinafter, abbreviated as AFM) to illuminate laser light to a sample from a tip of the optical fiber probe simultaneous with AFM operation to detect a surface shape and measure a sample optical characteristic (Japanese Patent Laid-open No. 174542/1995). FIG. 16 is a structural view showing a conventional optical fiber probe. This optical fiber probe uses an optical fiber 501 covered at a periphery by a metal film coating 502. A probe needle portion 503 is sharpened and has an aperture 504 at a tip of the probe needle portion 503.

On the other hand, in the AFM utilized as shape observing means for microscopic regions, a silicon or silicon-nitride micro-cantilever manufactured by a silicon process is broadly utilized. The micro-cantilever used in the AFM has a feature in mechanical characteristic such as in spring constant and resonant frequency because of high resonant frequency, good mass producibility and less variation in shape. By forming a microscopic aperture in a tip of the micro-cantilever used in AFM, as shown in FIG. 17, a probe for SNOM is known which is formed by a tip 505, a lever 506, a base 507, microscopic aperture 508 and a shade film 509 (S. Munster et al., Novel micromachined cantilever sensors for scanning near-field optical microscopy, Journal of Microscopy, vol. 186, pp17–22, 1997). Here, a tip 505 and a lever 506 are formed of silicon nitride or silicon. By incidence of light on the SNOM probe as shown at Light in FIG. 17, near-field light can be illuminated from the microscopic aperture 508.

However, the optical fiber probe shown in FIG. 16 is poor in mass producibility because of manual manufacture one by one. Also, because the optical fiber 501 is used as a light-propagating member, the difference in propagation characteristic by wavelength is great and difficult in use for spectroscopic analysis.

Although the SNOM probe shown in FIG. 17 is easy to mass-produce by a silicon process, foreign matter including dust in air readily intrudes into a recess in a tip portion. Accordingly, there has been a problem that near-field light illuminated from the microscopic aperture is not stabilized in intensity. Further, where the tip in position is formed at a tip of the cantilever, a spot of incident light is off the cantilever during introduction of light into the microscopic aperture. When detecting an optical signal from a sample by the microscopic aperture, optical signals at other than the tip end are detected. consequently, there has been a problem that the optical image of SNOM is worsened in optical-image S/N ration. Further, because the tip is formed using mold formed of anisotropic etching of silicon, the tip at an end angle is fixed as 70 degrees. Accordingly, there has been a problem that the near-field light illuminated from the microscopic aperture cannot be increased in intensity. Further, the lever 506 and the tip 505 are structured of a material small in reflectivity relative to a wavelength of incident light or the light detected by the microscopic aperture. In the NOM probe shown in FIG. 17, because the structural material of them is in an optical path, the intensity of incident light or detection light attenuates due to reflection upon the structural material. There has been a problem that the near-field light illuminated from the microscopic aperture 508 and the light detected by the microscopic aperture 508 are decreased in intensity.

Therefore, this invention has been made in view of the above, and it is an object to provide a near-field optical probe having a cantilever for SNOM to illuminate and/or detect light through a microscopic aperture, which is excellent in mass-producibility and evenness, capable of obtaining an intensity of stable near-field light without intrusion of foreign matter to a tip portion, improves optical-image S/N ratio by shading leak light and capable of obtaining great near-field light intensity, and a method for manufacturing same.

SUMMARY OF THE INVENTION

Therefore, the present invention has a structure, in a near-field optical probe for observing and measuring optical information in a microscopic region of a sample by generating and/or detecting near-field light, comprising: a cantilever; a base for supporting the cantilever; a tip in the form of a conical or pyramidal formed on the cantilever in a surface opposite to a surface of the base; a microscopic aperture formed in an end of the tip; a shade film formed on the surface of the cantilever opposite to the surface of the base and on a surface of the tip excepting the microscopic aperture; wherein the tip and the cantilever are formed using a transparent material high in transmissivity for a wavelength of light to be generated and/or detected in the microscopic aperture, the tip being filled with the transparent material. Accordingly, the near-field optical probe can illuminate near-field light to the sample by introducing light to the microscopic aperture and/or detect optical information in a microscopic region of a sample by the microscopic aperture.

Also, because the tip is filled with a transparent material, foreign matters will not intrude into the tip, enabling illumination and/or detection of near-field light with stable intensity. Furthermore, because the refractive index of the transparent member is greater than a refractive index of air, it is possible to increase the amount of near-field light passing through the microscopic aperture.

Also, the transparent material forming the tip and the transparent material forming the cantilever are structurally formed of a same transparent material. Accordingly, because there is no reflection between the tip and the cantilever, light incidence on the microscopic aperture and optical information detection from the microscopic aperture can be made with efficiency. Also, because the transparent material can be formed at one time in the manufacture process, the manufacturing method is facilitated. Furthermore, the transparent material is structurally silicon dioxide. Because silicon dioxide is one of the materials having high transmissivity in a visible portion of light, generation and detection of near-field light can be made with efficiency. Also, because silicon dioxide is a material generally used in the silicon process, it is favorable in control of form and mass producibility.

Also, the tip and the cantilever are structurally formed of transparent materials different in optical characteristic. Accordingly, if for example the cantilever is formed of silicon dioxide and the tip of diamond, the mechanical characteristic of the cantilever, such as resonant frequency, can be controlled with accuracy due to high formability of silicon dioxide and the wear resistance of the tip can be improved by the high wear resistance of diamond. Furthermore, in transparent materials, diamond is high in transmissivity and one of the materials extremely high in refractive index, making possible to increase the amount of near-field light transmitting through the microscopic aperture.

Also, the tip is structurally in a circular conical form. Accordingly, the microscopic aperture in outer shape is circular. By controlling the polarizing characteristic of incident light, near-field light having an arbitrary polarizing characteristic can be illuminated from the microscopic aperture.

Also, the tip structurally comprises a plurality of cones or pyramids different in angle of a side surface of the cone or pyramid. Accordingly, by reducing the tip end angle and increasing the taper angle to a middle of the tip, the near-field optical probe can be provided which satisfies at the same time high resolution of concave/convex images and optical images and generation efficiency of near-field light. Similarly, detection efficiency can be improved also in a collection mode for detecting optical information in a microscopic region of a sample by the microscopic aperture.

The cantilever structurally has a lens to focus incident light to the microscopic aperture and/or collimate light detected at the microscopic aperture. The lens is structurally a Fresnel lens formed on a side of the base of the cantilever or a refractive-index distribution type lens formed by controlling a refractive-index distribution in the cantilever. Accordingly, because the amount of light to be incident on the microscopic aperture can be increased, the intensity of near-field light illuminated from the microscopic aperture can be increased. Also, optical information of a sample can be detected efficiently by collimating the light detected by the microscopic aperture and guiding it to the detector by a focus lens.

Also, an end of the tip is structurally positioned nearly in a same plane as an end surface of the shade film. Accordingly, because the distance between the microscopic aperture and a sample can be made extremely short, the near-field light illuminated from and/or detected by the microscopic aperture can be converted into propagation light, improving the S/N ratio in the optical image. Also, improved is dissolving power of optical images.

Also, an end of the tip structurally protrudes greater than the end face of the shade film, an amount of protrusion thereof being equal to or smaller than a half of a wavelength of incident light on the microscopic aperture and/or light to be detected at the microscopic aperture. Accordingly, because the tip is small in radius of curvature, it is possible to improve resolution of concave/convex images and optical images for the scanning probe microscope. Furthermore, because the tip end and microscopic aperture center position are aligned, positional deviation is extremely small between a concave/convex image and an optical image.

Also, provided that a height of the tip is H, an inclination angle of the cantilever is θ1, a spot diameter on the cantilever of incident light onto the tip and/or a spot diameter on the cantilever of light detected by the microscopic aperture and being incident on a detector is R1, and a distance of from a center of the tip to a free end of the cantilever is L1, L1 is structurally given satisfying $R1 < L1 < H/\tan\theta1$.

Also, a tip of the cantilever structurally has a slant portion in such a form as spreading from the tip side to the base side. Also, a side surface of the cantilever structurally has a slant portion in such a form as spreading from the tip side to the base side. Furthermore, at a tip of the cantilever, a thin-sheet-formed connecting portion is structurally formed in a manner protruding toward the base, a thin-sheet-formed penthouse portion being formed extending parallel with the cantilever from the connecting portion.

With such a structure, because the tip at an end can access a sample and perfect light shade is possible excepting incident light and/or light detected by the microscopic aperture, it is possible to stably acquire convex/concave images and optical images.

Also, the near-field optical probe, because of capability of being fabricated using a silicon process, is high in mass producibility and good in shape reproducibility. Also, in a process for manufacturing a near-field optical probe, an outer shape forming process for the cantilever includes isotropic etching to form the slant portion. Also, in the method for manufacturing a near-field optical probe, a forming process for the connecting portion and the penthouse portion includes a process to form a step in a substrate and a process to form deposit the transparent material on the substrate. Accordingly, the near-field optical probe can be easily fabricated.

Also, in a near-field optical apparatus using a near-field optical probe, structure is made having an introducing/detecting optical system for introducing light to the microscopic aperture or detecting light from the microscopic aperture, detecting means for detecting a distance between the microscopic aperture and the sample, and a fine movement mechanism for finely moving the sample and/or the near-field optical probe, wherein the detecting means uses an optical lever method, a lens of the introducing/detecting optical system and a mirror of the detecting means being integrated together.

Also, in a near-field optical apparatus using a near-field optical probe, structure is made having an introducing/detecting optical system for introducing light to the microscopic aperture or detecting light from the microscopic aperture, detecting means for detecting a distance between the microscopic aperture and the sample, and a fine movement mechanism for finely moving the sample and/or the near-field optical probe, wherein the detecting means has a light source and an optical detector in a plane nearly vertical to the cantilever.

Also, the optical detector structurally detects reflection light upon the cantilever of light emitted from the light source.

Also, the optical detector structurally detects diffraction light upon the cantilever of light emitted from the light source.

Accordingly, because an introducing/detecting optical system having a great NA can be used free from interference between the detecting means and the introducing/detecting optical system, it is possible to emit near-field light great in light intensity from the microscopic aperture and, conversely, detect light from the microscopic aperture with efficiency.

Also, in a near-field optical apparatus using a near-field optical probe, structure is made having an introducing/detecting optical system for introducing light to the microscopic aperture or detecting light from the microscopic aperture, detecting means for detecting a distance between the microscopic aperture and the sample, and a fine movement mechanism for finely moving the sample and/or the near-field optical probe, wherein the detecting means detects interference at between an optical fiber arranged close to the cantilever and the cantilever.

Also, in a near-field optical apparatus using a near-field optical probe, structure is made having an introducing/detecting optical system for introducing light to the microscopic aperture or detecting light from the microscopic aperture, detecting means for detecting a distance between the microscopic aperture and the sample, and a fine movement mechanism for finely moving the sample and/or the near-field optical probe, wherein the detecting means is displacement detecting means of the cantilever provided on the near-field optical probe.

Accordingly, because an introducing/detecting optical system having a great NA can be used free from interference between the detecting means and the introducing/detecting optical system, it is possible to emit near-field light great in light intensity from the microscopic aperture and, conversely, detect light from the microscopic aperture with efficiency. Moreover, because the detecting means is small in size and lightweight, the near-field optical probe can be moved at high speed by the fine movement mechanism.

Also, in a near-field optical apparatus using a near-field optical probe, structure is made having an introducing/detecting optical system for introducing light to the microscopic aperture or detecting light from the microscopic aperture, detecting means for detecting a distance between the microscopic aperture and the sample, and a fine movement mechanism for finely moving the sample and/or the near-field optical probe, wherein the introducing/detecting optical system has an optical fiber provided at a tip a lens function.

Accordingly, because an introducing/detecting optical system having a great NA can be used free from interference between the detecting means and the introducing/detecting optical system, it is possible to emit near-field light great in light intensity from the microscopic aperture and, conversely, detect light from the microscopic aperture with efficiency. Moreover, because the introducing/detecting optical system is small in size and lightweight, the near-field probe can be moved at high speed by the fine movement mechanism.

Also, a near-field optical probe has, on the cantilever, a convex portion separate from the tip in position closer to the free end than a fixed end of the cantilever. Also, a near-field optical probe has the convex portion is formed on the cantilever on a side forming the tip in position closer to the fixed end than the tip.

Accordingly, the near-field optical probe resonant frequency can be lowered and optical-image S/N ratio can be improved. Also, because spring constant can be increased, it is possible to reduce the affection of air damping caused by the provision of the shade region, providing a near-field optical probe having stable operation characteristic.

Also, a near-field optical probe is made wherein the convex portion is formed on the cantilever on a side opposite to the side forming the tip.

Accordingly, a near-field optical probe can be obtained in which the convex portion will not contact a sample during observing a sample great in rise.

Also, in the process of manufacturing a near-field optical probe, included is a process for forming simultaneously a convex portion and a tip. A method for manufacturing a near-field optical probe includes a process to form a mold for forming the convex portion, a process of depositing a material to be formed into the convex portion in the mold, a process to planarize the material to be formed into the convex portion to bury the material to be formed into the convex portion in the mold, and a process to form the tip on the substrate buried with the material to be formed into the convex portion. Also, the process to planarize the material to be formed into the convex portion to bury the material to be formed into the convex portion in the mold is a polishing process.

Accordingly, it is possible to manufacture near-field optical probes low in resonant frequency and great in spring constant with high mass producibility, providing near-field optical probes inexpensive.

DETAILED DESCRIPTION OF THE PREFERRED EMBODIMENTS

Hereunder, explanations will be made in detail on embodiments of a near-field optical device and method for manufacturing the same according to the present invention with reference to the accompanying drawings.

(Embodiment 1)

Figure 1:
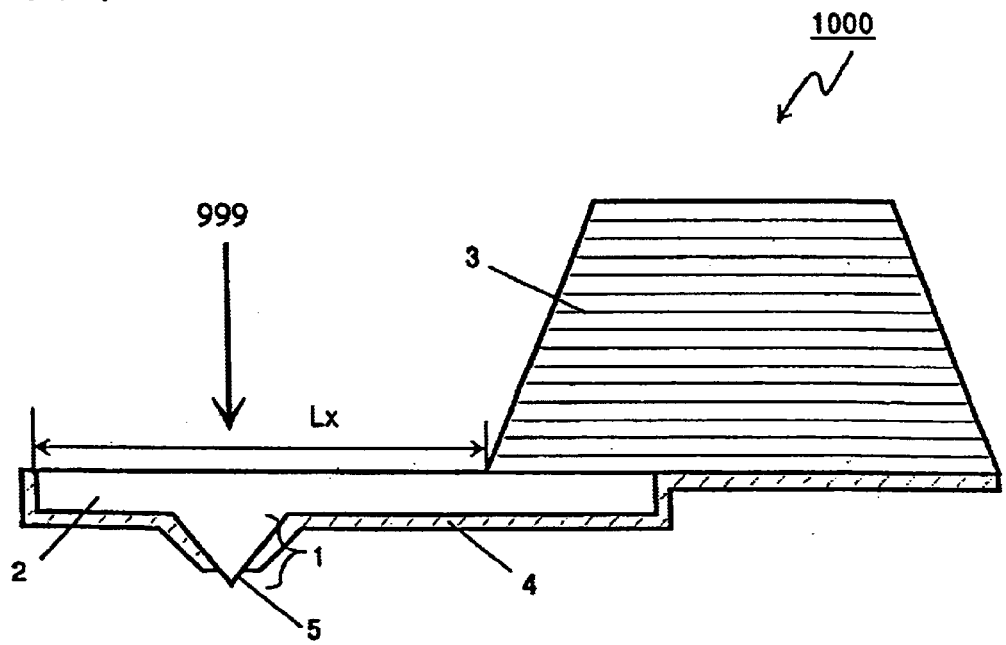
FIG. 1 is a structural view of a near-field optical probe according to a first embodiment of the present invention.

FIG. 1 is a schematic view of a near-field optical probe 1000 according to Embodiment 1 of the invention. The near-field optical probe 1000 of the invention has a tip 1, a lever 2, a base 3, a shade film 4 and a microscopic aperture 5. The tip 1 in a weight form and the lever 2 in a thin sheet cantilever are integrally formed, wherein the tip 1 is formed on the lever 2 protruded straight from the base 3 on an opposite surface to the base 3. The shade film 4 is formed over a surface of the lever 2 opposite to the base 3 and a surface of the tip 1. Although the shade film 4 is not needed formed on the entire surface of the lever 2 opposite to the base 3, doing so is preferred. The microscopic aperture 5 is a portion of the tip 1 free of shade film 4. The tip 1 at an apex protrudes with respect to an end surface of the shade film 4. Also, the tip 1 at an end may position in the same plane as the end surface of the shade film 4. By externally introducing incident light 999 to the near-field optical probe 1000, the near-field optical probe 1000 is allowed to illuminate near-field light from the microscopic aperture 5. Also, optical information on a sample can be detected by the microscopic aperture 5. Furthermore, it is possible to simultaneously conduct near-field light illumination from the microscopic aperture 5 and optical information detection on a sample by the microscopic aperture.

The tip 1 and the lever 2 are formed of a transparent material for a wavelength of incident light 999 used in a scanning near-field microscope. In the case that the wavelength of incident light 999 is in a visible region, there are dielectric, such as silicon dioxide and diamond, and polymers including polyimide. Meanwhile, for an ultraviolet region of a wavelength of incident light 999, there is dielectric, such as magnesium di-fluoride and silicon dioxide as a material of the tip 1 and lever 2. Also, where the wavelength of incident light 999 is in an infrared region, there are zinc selenium and silicon as a material of the tip 1 and lever 2. The material of the base 3 is dielectric, such as silicon or silicon dioxide, or a metal, such as aluminum or titanium. The material of the shade film 4 is formed of a material having a high shade ratio relative to a wavelength of incident light 999 or/and to a light wavelength detected by the microscopic aperture 5, such as aluminum or gold.

The height of the tip 1 is several $\mu$m to ten and several $\mu$m. The length of the lever 2 is several tens urn to several thousands $\mu$m. Also, the thickness of the lever 2 is nearly several $\mu$m. The thickness of the shade film 4 is, although different by the shade ratio, several tens $\mu$m to several hundreds $\mu$m. In FIG. 1, the size and shape of the microscopic aperture 5 as viewed at an underside surface is of a circle with a diameter smaller than incident light 999 or/and a wavelength of light detected by the microscopic aperture 5 or a polygon inscribing the same circle.

Figure 2:
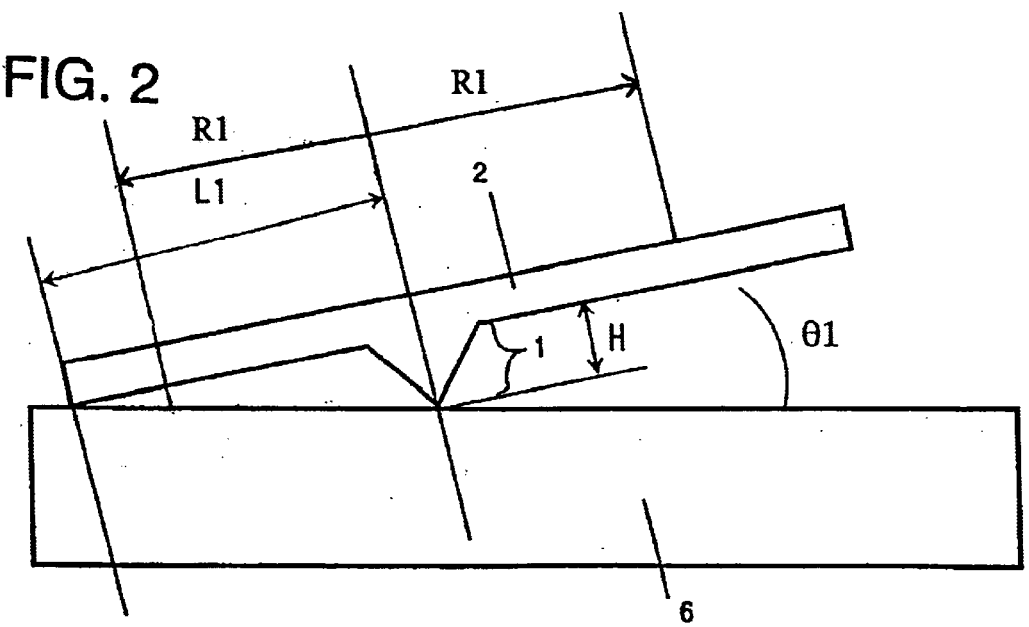
FIG. 2 is a view showing a state that a tip of the near-field optical probe according to the first embodiment of the invention accesses a sample.

FIG. 2 shows a side view illustrating a state that the near-field optical probe 1000 at a vicinity of the tip 1 is in proximity to a sample 6. For simplicity, the shade film 4 is omitted. The near-field optical probe 1000 in a state inclined by an angle θ1 is in proximity to the sample 6. Assuming herein that the height of the tip 1 is H and the distance from an end of the tip 1 to the tip of the lever 2 is L1, the tip 1 and the lever 2 at their ends simultaneously contact the sample 6 when $$L1 = H/\tan\theta1 \quad (1).$$

Thus, it is impossible to use as a probe for a scanning probe microscope. Accordingly, the near-field optical microscope 1000 must satisfy $$L1 < H/\tan\theta1 \quad (2).$$

In order to improve the S/N ratio of an optical signal when incident light 999 is incident on the near-field optical probe 1000, if the radius of a spot of incident light 999 on the lever 2 is assumed R1, a shade region must be provided satisfying $$R1 < L1 \quad (3).$$

Consequently, L1 must satisfy $$R1 < L1 < H/\tan\theta1 \quad (4).$$

Figure 3:
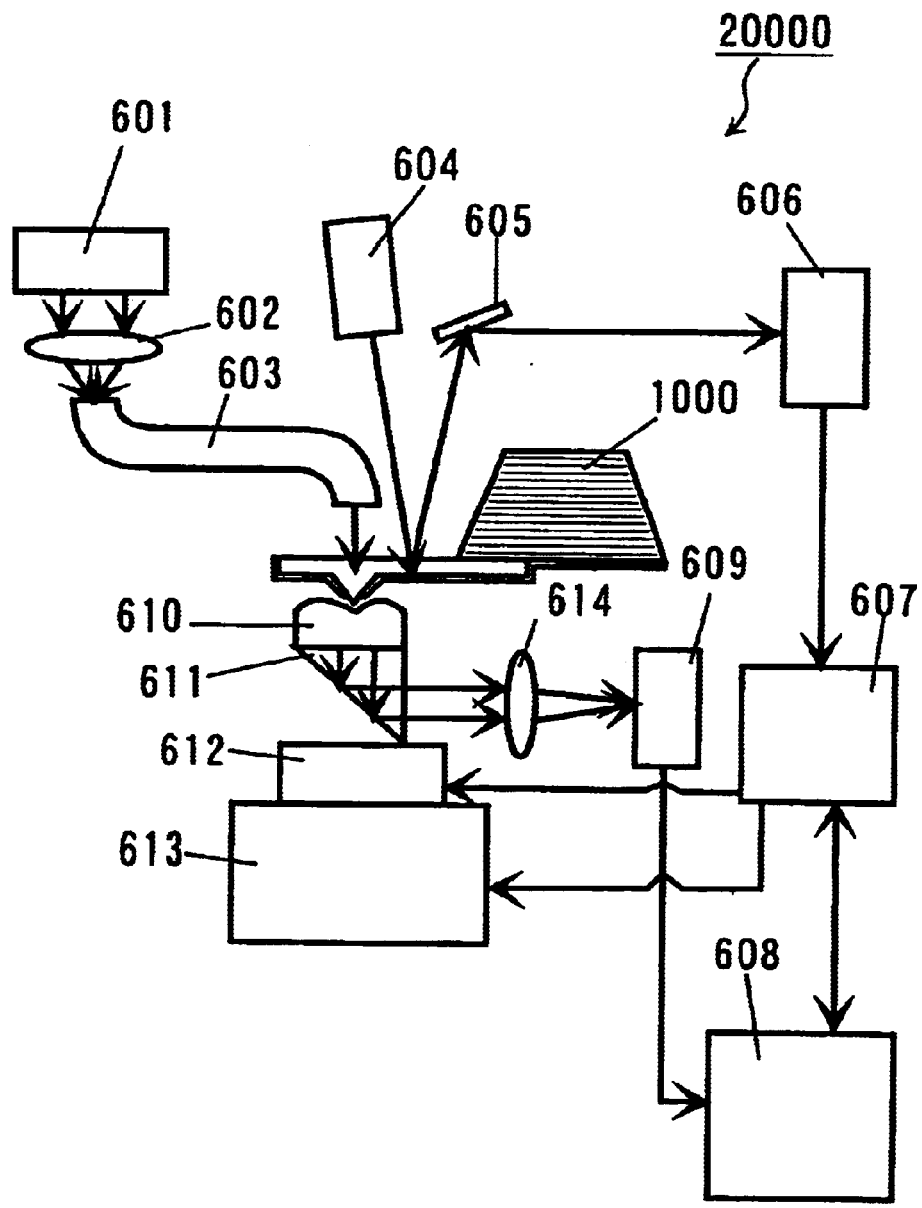
FIG. 3 is a structural view of a scanning probe microscope using the near-field optical probe according to the first embodiment of the invention.

A structure of a scanning probe microscope 20000 is shown in FIG. 3, which is mounted with a near-field optical probe 1000 concerning Embodiment 1 of the invention. Explanation is herein made for simplification on a case that the near-field optical probe 1000 is under control of a contact mode. This scanning probe microscope 20000 has a near-field optical probe 1000 as shown in FIG. 1, a light source 601 for optical information measurement, a lens 602 arranged in front of the light source 601, an optical fiber 603 for propagating the light focused by the lens 602 to the near-field optical probe 1000, a prism 611 arranged underneath a sample 610 to reflect the propagation light caused at the end of a tip 10, a lens 614 for collecting the propagation light reflected by the prism 611, and light detecting section 609 for receiving the focused propagation light.

Meanwhile, at the above of the near-field optical probe 1000, provided are a laser oscillator 604 for outputting laser light, a mirror 605 for reflecting the laser light reflected upon an interface of the lever and the shade film of the near-field optical probe 1000 and a vertically-two-divided photoelectric converting section 606 for receiving reflected laser light for photolectyic conversion. Furthermore, provided are a rough movement mechanism 613 and fine movement mechanism 612 for movably controlling the sample 610 and prism 611 in XYZ directions, a servo mechanism 607 for driving these rough movement mechanism 613 and fine movement mechanism 612, and a computer 608 for controlling the apparatus overall.

Next, the operation of this scanning probe microscope 20000 will be explained. The laser light emitted from the laser oscillator 604 is reflected upon the interface between the lever and the shade film of the near-field optical probe 1000. The lever of the near-field optical probe 100, when the microscopic aperture and the sample 610 at their surfaces approach, deflects due to attracting or repelling force to or from the sample 610. Consequently, the reflected laser light changes in its optical path, which is detected by a photoelectric converting section 606.

The signal detected by the photoelectric converting section 606 is sent to the servo mechanism 607. The servo mechanism 607 controls the rough movement mechanism 613 and fine movement mechanism 612 based on a signal detected by the photoelectric converting section 606 such that the near-field optical probe 1000 approaches the sample 610 or the near-field optical probe 1000 becomes constant in deflection during surface observation. The computer 608 receives the information of a surface shape from a control signal of the servo mechanism 607.

Meanwhile, the light emitted from the light source 601 is focused by the lens 602 and reaches the optical fiber 603. The light propagated in the optical fiber 603 is introduced to the tip of the near-field optical probe 1000 through the lever and illuminated from the microscopic aperture to the sample 610. On the other hand, the optical information of the sample 610 reflected by the prism 611 is focused by the lens 614 and introduced to the light detecting section 609. The signal of the light detecting section 609 is acquired through an analog input interface of the computer 608 and detected as optical information by the computer 608. Incidentally, the light incident method onto the tip may be a method of not using an optical fiber 603 but collecting the light emitted from the light source 601 directly onto the tip by a lens thereby introducing incident light.

Also, although the illumination mode was herein explained wherein light is incident onto the near-field optical probe 1000 to illuminate near-field light from the microscopic aperture 5 onto the sample, the near-field optical probe 1000 can be used also in a collection mode for detecting near-field light caused on the sample 6 surface by the microscopic aperture 5. Also, it is needless to say that the near-field optical probe 1000 can be used also in an observation method for simultaneously conducting the illumination mode and the collection mode. Furthermore, although the transmission mode for detecting the light transmitted through the sample 6 was explained in FIG. 2, the near-field optical probe 1000 can be used also in a reflection mode for detecting the light reflected upon the sample 6. Also, it is needless to say that the near-field optical probe 1000 can be used in a dynamic force mode for controlling the distance between the tip 1 and the sample 6 to keep constant an amplitude change in the lever 2 or vibration frequency change in the lever 2 caused by a repelling force or attracting force acting between the tip 1 and the sample 6 due to vibration of the lever 2 caused by applying vibration to the near-field optical probe 1000 by use of a bimorph or the like.

As explained above, according to the near-field optical probe 1000 of Embodiment 1, there is no possibility that foreign matter intrudes in the microscopic aperture 5 because of the structure that the upper portion of the microscopic aperture 5 is filled by a transparent member. Consequently, the near field light caused from the near-field optical probe 1000 is stabilized in intensity. Also, the tip 1 is improved in impact-resistance and wear-resistance due to the tip 1 filled with a transparent material for a wavelength of the light source used in the scanning near-field microscope. Also, because the material constituting the tip 1 has refractivity greater than air, the light propagating in the tip 1 is shortened in wavelength than in air. Consequently, because the amount of the light transmitted through the microscopic aperture 5 increases than in the case of propagation in air and transmission through the microscopic aperture 5, it is possible to enhance the intensity of the near-field light illuminated from the microscopic aperture 5. Also, where the end of the tip 1 is structured to protrude with respect to an end surface of the shade film 4, because the radius at the end of the tip is small, the scanning probe microscope can be improved in resolution of concave-convex images or optical images. Furthermore, because of coincidence between the tip 1 end and the center position of the microscopic aperture 5, the deviation of a concave-convex image and an optical image is very small. Also, due to L1 satisfying Equation (4), because the tip 1 at its end can proximate the sample and completely shade incident light 999, a concave-convex image and optical image can be stably obtained. Also, even if the lens NA for incidence of light onto the scanning near-field microscope 1000 is increased, there is no kick of incident light on the tip 1 because the lever 2 is a transparent member so that the incident light can be efficiently guided to the microscopic aperture 5 thereby making possible to increase producing efficiency of near-field light for illumination from the microscopic aperture 5. Also, the near-field optical probe 1000 for producing near-field light from the microscopic aperture 5 through collection by the lens and propagation through the lever 2 and tip 1 as a transparent member is wide in a wavelength region having high transmissivity relative to an incident light wavelength. Accordingly, the scanning probe microscope 20000 can be used in the application field such as spectroscopic analysis. Also, because of capability of producing near-field light great in intensity, it is possible to illuminate near-field light having required energy density for photolithography, photo-molding, optical CVD and thermal forming, use the scanning probe microscope 20000 as an optical forming apparatus, and observe simultaneously a forming shape by the use of the near-field optical probe 1000 high in concave-convex image resolution. The scanning probe microscope 20000 as a spectroscopic analysis or forming apparatus can shorten the time required for analysis or forming because the near-field light produced from the near-field optical probe 1000 is high in intensity. Also, by making the near-field optical probe 1000 with a multi-cantilever, it is possible to analyze or form over a large area in a brief time.

Next, a method for manufacturing a near-field optical probe 1000 according to Embodiment 1 of the invention will be explained based on FIG. 4 and FIG. 5.

Figure 4A:
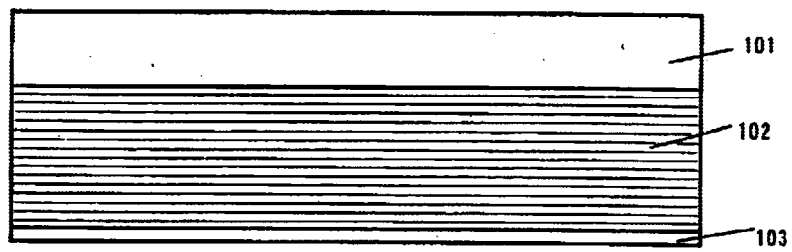
FIGS. 4A–4C are a process view (1) showing a manufacturing method for a near-field optical probe according to the first embodiment of the invention.

FIG. 4A shows a state that a transparent member 101 to be formed into a tip 1 and lever 2 is deposited on a substrate 102. Incidentally, hereunder, the figure at an upper portion is referred to as a front surface and at a lower portion as a backside surface. A transparent member 101 is deposited 101 by plasma-CVD or sputter on the substrate 102 having a mask material 103 on the backside surface. The deposition amount of the transparent member 101 is nearly equal to or somewhat thicker than a sum of a tip 1 height and a lever 2 thickness.

Figure 4B:
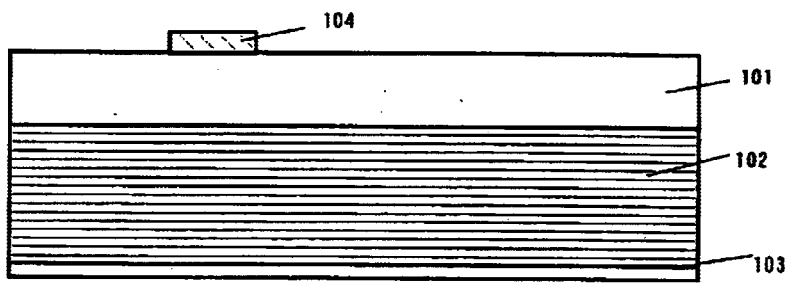

After depositing the transparent member 101, as shown in FIG. 4B a mask 104 for a tip is formed by a method of photolithography or the like on the transparent member 101. The mask 104 for a tip uses dielectric, such as photoresist or polyimide.

Figure 4C:
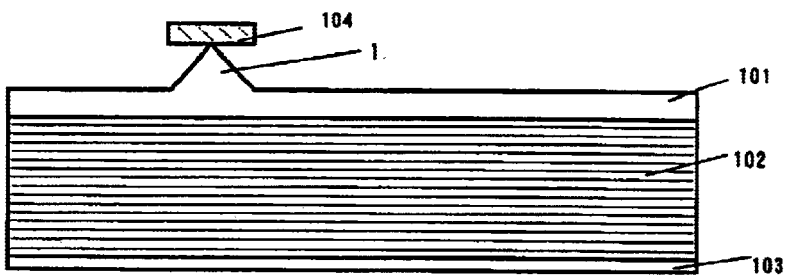

After forming a mask 104 for a tip, a tip 1 is formed by isotropic etching, such as wet etching or dry etching, as shown in FIG. 4C.

Figure 5A:
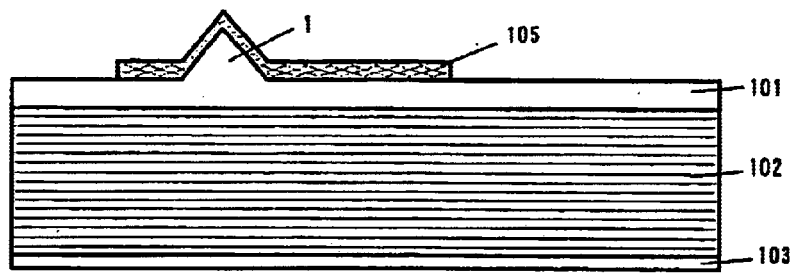
FIGS. 5A–5D are a process view (2) showing a manufacturing method for a near-field optical probe according to the first embodiment of the invention.

After forming the tip 1, a mask 105 for a lever is formed on the transparent member 101 as shown in FIG. 5A.

Figure 5B:
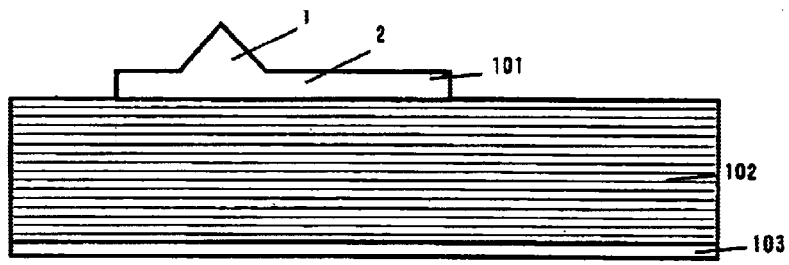
Figure 5C:
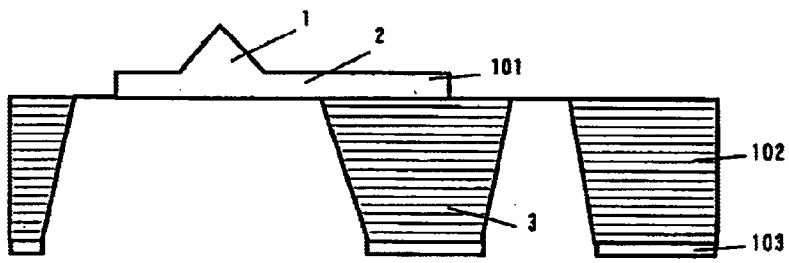

After forming the mask 105 for a lever, a lever 2 is formed by anisotropic etching, such as reactive ion etching (RIE), as shown in FIG. 5B.

After forming the lever 2, the mask material 103 is patterned by photolithography. Thereafter, a release and base 3 for a lever 2 is formed, as shown 5C, by crystal anisotropy etching or anisotropy dry etching with tetramethylammonium hydroxide (TMAH or potassium hydroxide (KOH).

Figure 5D:
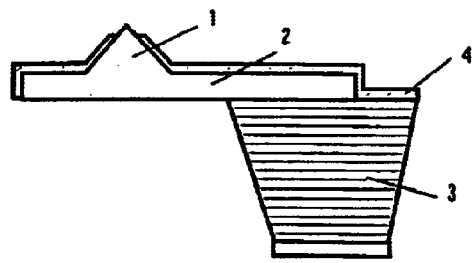

Finally, a shade film 4 is deposited on the front surface. Unwanted portions of the shade film 4 are removed by depressing the tip 1 on a sample by a focused ion beam or upon observation, thereby forming a microscopic aperture 5 as shown in FIG. 5D and obtaining a near-field optical probe 1000.

According to the manufacturing method explained hereinabove, a near-field optical probe 1000 can be manufactured according to Embodiment 1 of the invention. Also, because the manufacturing method explained uses a silicon process, it is possible to manufacture near-field optical probes on a large-scale basis and with high reproducibility. Accordingly, the near-field optical probe 1000 can be provided at low cost. Also, because the lever 2 is easy to reduce the size, it is possible to increase the resonant frequency of the lever 2 of the near-field optical probe and, at the same time, decrease the spring constant. Consequently, in the scanning probe microscope, distance control can be stably made between an end of the tip 1 and a sample 610, and wherein the end of the tip 1 and the sample 610 can be prevented from being damaged. Furthermore, scanning velocity in the scanning probe microscope can be increased. Also, by controlling the adhesion between the transparent member 101 and the mask 104 for a tip, an arbitrary end angle can be obtained for the tip 1. Accordingly, by increasing an end angle of the tip end, the near-field light illuminated from the microscopic aperture 5 can be increased in intensity. Also, a tip 1 having a plurality of taper angles is obtainable by conducting the tip-1-forming process a plurality of number of times. Consequently, by decreasing the end angle of the tip 1 and increasing the taper angle to a middle portion of the tip 1, it is possible to provide a near-field optical probe satisfying at the same time the high resolution for concave-convex images and optical images and the high producing efficiency of near-field light. Similarly, also in the collection mode for detecting optical information of a sample in a microscopic region by the microscopic aperture 5, the detection efficiency can be improved. Also, the tip 1 can be made into a shape of circular cone or arbitrary polygonal cone by providing the tip mask 104 with a circular or polygonal shape as viewed from the above in FIG. 4B. Where the tip 1 is in a circular cone, the microscopic aperture 5 is circular in shape whereby near-field light having an arbitrary polarization characteristic can be illuminated from the microscopic aperture 5 by controlling the polarization characteristic of the light incident on the near-field optical probe 1000. Also, where the tip 1 is in a polygonal cone shape, the microscopic aperture 5 is given a polygonal shape enabling illumination of light having a magnitude great in a particular polarization direction to a sample. Also, a near-field optical probe 1000 having a lens on the tip 1 can be obtained by forming a Fresnel lens pattern on the substrate 102 to form a tip 1 on a Fresnel-lens pattern, forming a portion having a refractivity distribution in a transparent member in a portion for forming a tip upon deposition of a transparent member 101, or forming a lens-formed recess in a portion of the substrate 102 for forming a tip 1 to deposit the transparent member 101. Accordingly, the near-field light produced from the microscopic aperture 5 can be increased in intensity. Also, according to the manufacturing method for a near-field optical probe 1000, it is easy to form, on the base 3, a multi-cantilever having a plurality of levers 2, tips 1 and microscopic apertures 5. According to the multi-cantilever, because a plurality of tips 1 and microscopic apertures 5 can be simultaneously scanned, observation over a large area is possible at high velocity. Also, according to the manufacture method for a near-field optical probe 1000, because a sensor of a piezoelectric or static capacitance type to be fabricated by a similar manufacturing method can be easily integrated on the lever 2, deflection of the lever 2 can be detected without using an optical lever. Also, deflection of the lever 2 can be detected by structuring the lever by a piezoelectric member including of quartz and forming an electrode. Furthermore, where the lever 2 is structured of quartz, it is also possible to detect deflection in the lever 2 and/or apply vibration to the lever 2.

(Embodiment 2)

Figure 6:
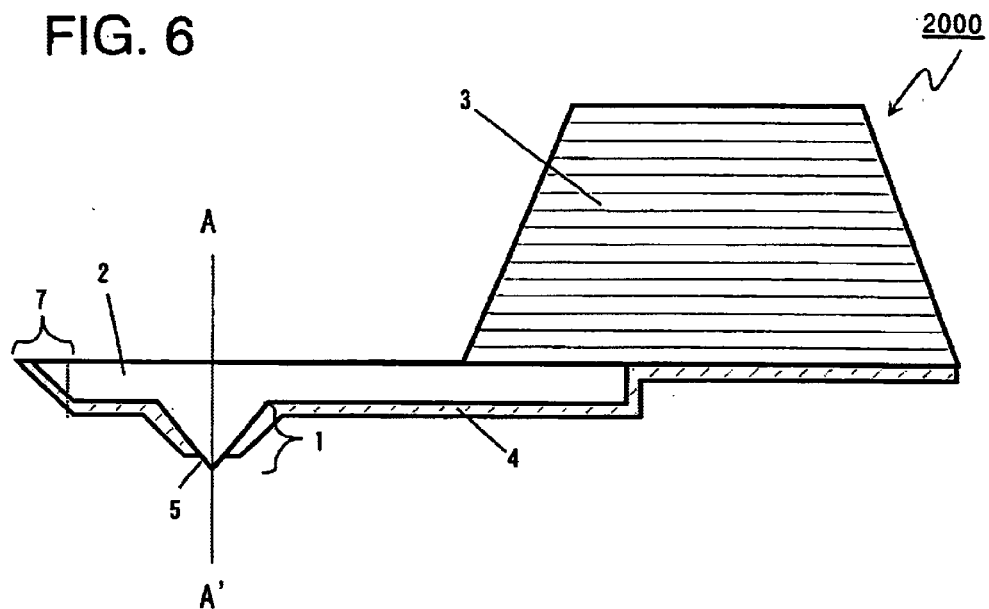
FIG. 6 is a structural view of a near-field optical probe according to a second embodiment of the present invention.
Figure 7:
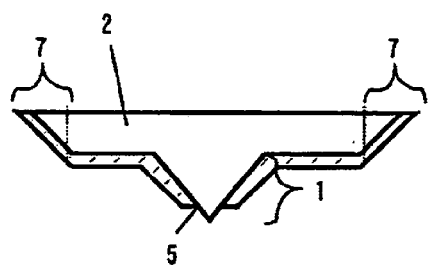
FIG. 7 is a sectional view of a near-field optical probe according to the second embodiment of the present invention.

FIG. 6 is a schematic view of a near-field optical probe 2000 according to Embodiment 2 of the invention. The near-field optical probe 2000 has the structural elements of the near-field optical probe 1000 of Embodiment 1 and a slant portion 7 that is provided at a tip end of the lever 2 to extent from a tip-1 side to a base-3 side and formed of the same material as the lever 2. The section in a part shown at A–A' in FIG. 6 will be shown in FIG. 7. As illustrated, the slant portion 7 is provided also in an outer periphery of the lever 2.

Figure 8:
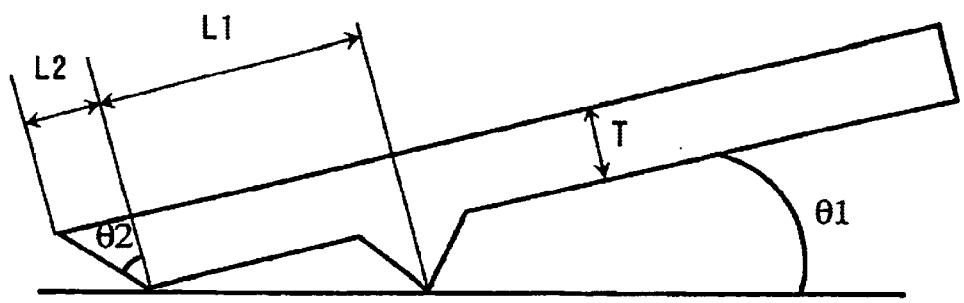
FIG. 8 is a view showing a state that a tip of the near-field optical probe according to the second embodiment of the invention accesses a sample.

In FIG. 8 is shown a state that the near-field optical probe 2000 at a vicinity of a tip 1 is in proximity to a sample 6. Incidentally, the shade film 4 is omitted for simplification. The near-field optical probe 2000 in a state inclined by an angle θ1 is placed in proximity to the sample 6. In FIG. 8, L1 is a length defined by Equation (1). Assuming that a lever thickness is T and a taper angle of the slant portion 7 is θ2, a length L2 of the slant portion 7 in a lever lengthwise direction is to be determined by:

$$L2 = T/\tan(90° - \theta 2) \qquad (5).$$

Accordingly, the near-field optical probe 2000 of the present invention can increase the shade area by a length L2 than the near-field optical probe 1000.

The other Constituent parts than the slant portion 7 of the near-field optical probe 2000 is almost the same as the near-field optical probe 1000 of the invention.

The near-field optical probe 1000 can be used in place of the near-field optical probe 2000 for the scanning probe microscope 20000.

As explained above, according to the near-field optical probe 2000 of the invention, the shade region can be broadened greater than the first embodiment of the invention. Because of reduction in affection of leak light due to reflection upon a cantilever surface, an optical image with high S/N ratio is to be obtained. Also, by broadening the shade region for the near-field optical probe 2000, it is possible in the scanning probe microscope 20000 to obtain an optical image without suffering from affection of leak light even if a spacing is increased between the optical fiber 603 and the lever 2. Furthermore, where the light incidence means on the near-field optical probe 2000 for the scanning probe microscope 20000 collects light only by a lens, it is possible to obtain an optical image with high S/N ratio without suffered from leak light even if the lens NA is small. Meanwhile, because generally as the lens NA is smaller the longer the lens focal distance and the deeper the lens focal depth become, making possible to increase the spacing between the near-field optical probe 2000 and the lens. Accordingly, position aligning of the near-field optical probe 2000 is facilitated thus simplifying operation of the scanning probe microscope 20000.

A manufacturing method for a near-field optical probe 2000 according to the present embodiment is almost similar to the manufacturing method for a near-field optical probe 1000 of Embodiment 1. In the manufacture method for a near-field optical probe 2000, isotropic etching such as wet etching or dry etching is used in the process explained in FIG. 5B thereby enabling a slant portion 7.

Consequently, according to the manufacturing method for a near-field optical probe 2000 of the Embodiment 2, a similar effect to the near-field optical probe 1000 can be obtained. Also, because the formation of a shade film 4 on a slant portion 7 as in the present Embodiment 2 is easier than the formation of a shade film 4 on the lever-2 side surface of the near-field optical probe 1000 of the present Embodiment 1, shield of light is facilitated for the lever-2 surface of the near-field optical probe 2000.

(Embodiment 3)

Figure 9:
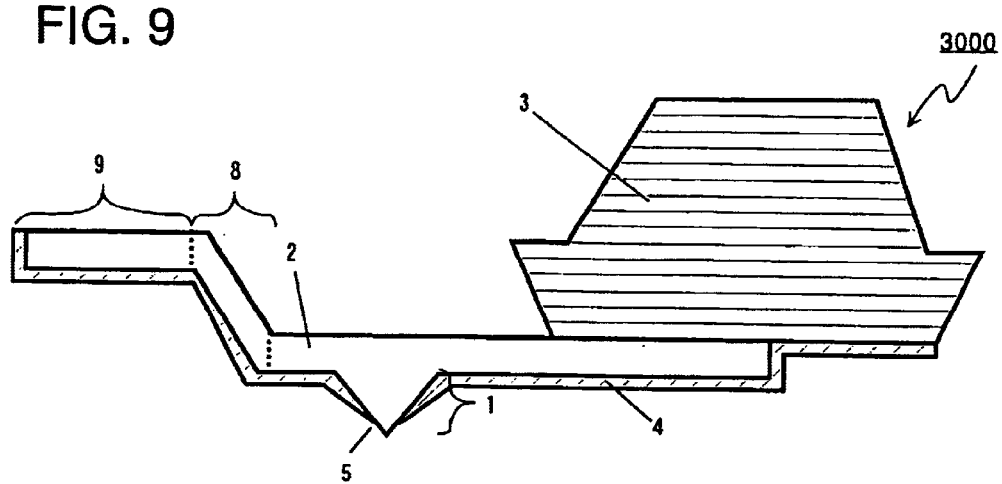
FIG. 9 is a structural view of a near-field optical probe according to a third embodiment of the present invention.

FIG. 9 is a schematic view of a near-field optical probe 3000 according to Embodiment 3 of the invention to be used by being mounted on the scanning probe microscope 20000. The near-field optical probe 3000 has a structural element of the near-field optical probe 1000 of Embodiment 1, a connecting portion 8 provided at a tip end of the lever 2 and extending on the opposite side to a tip 1, and a penthouse portion 9 formed in a manner extending nearly parallel with the lever 2 from the connecting portion 8.

The connecting portion 8 and the penthouse portion 9 are formed integral with the lever 2 and formed using the same material. Also, the connecting portion 8 and the penthouse portion 9 may use a different material from the lever 2. In this case, the material of the connecting portion 8 and penthouse portion 9 may be a an opaque material for a wavelength of light illuminated from the light source 601 in the scanning probe microscope 20000.

Figure 10:
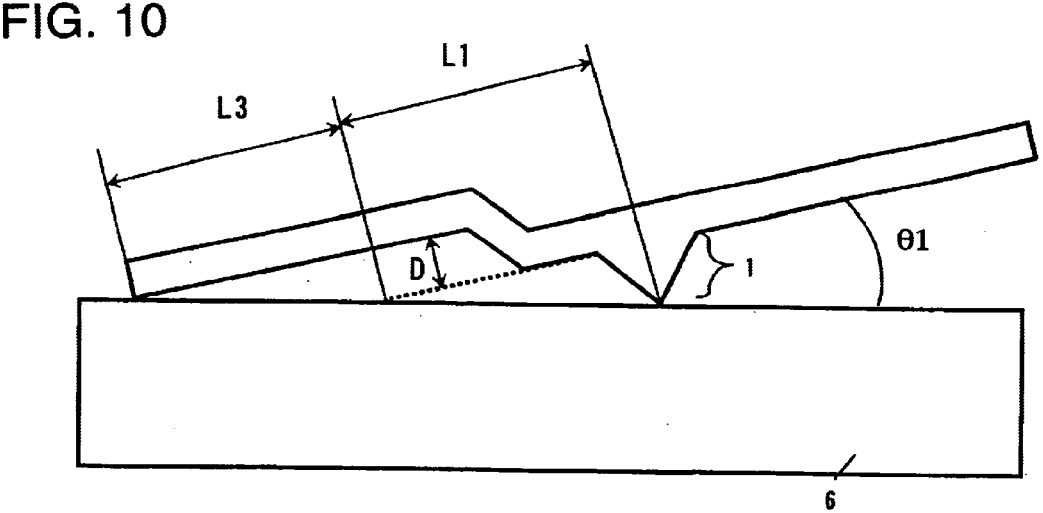
FIG. 10 is a view showing a state that a tip of the near-field optical probe according to a third embodiment of the invention accesses a sample.

FIG. 10 is a view showing a state that the tip 1 at an end of the near-field optical probe 3000 is in proximity to a sample 6. Note that the shade film 4 is omitted for simplification. The near-field optical probe 3000 in a state inclined by an angle θ1 is in proximity to the sample 6. In FIG. 8, L1 is a length defined by formula (1). Provided a height of the connecting portion 8 is D, a length when a tip of the penthouse portion 9 contacts the sample 6 is given L1+L3. Herein, $$L3=D/\tan(\theta 1) \qquad (6).$$

Figure 11:
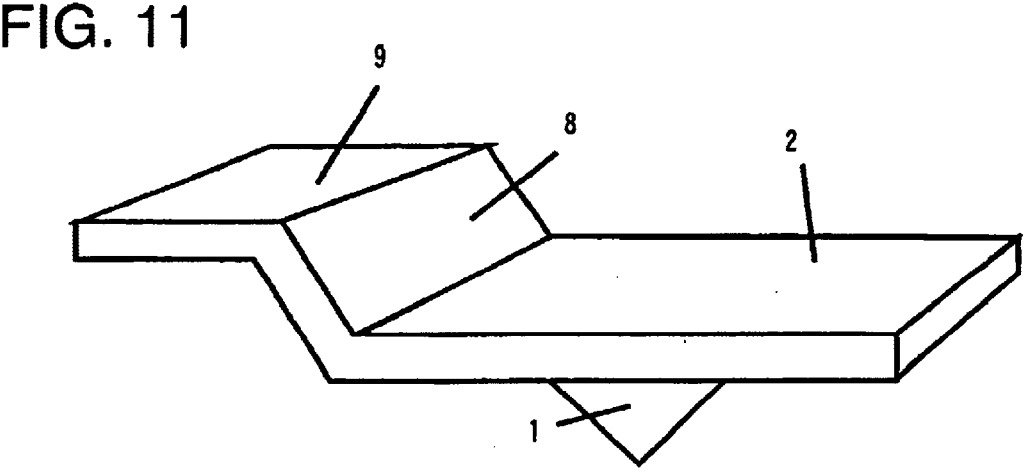
FIG. 11 is a perspective view of a tip portion of a near-field optical probe according to the third embodiment of the invention.
Figure 12:
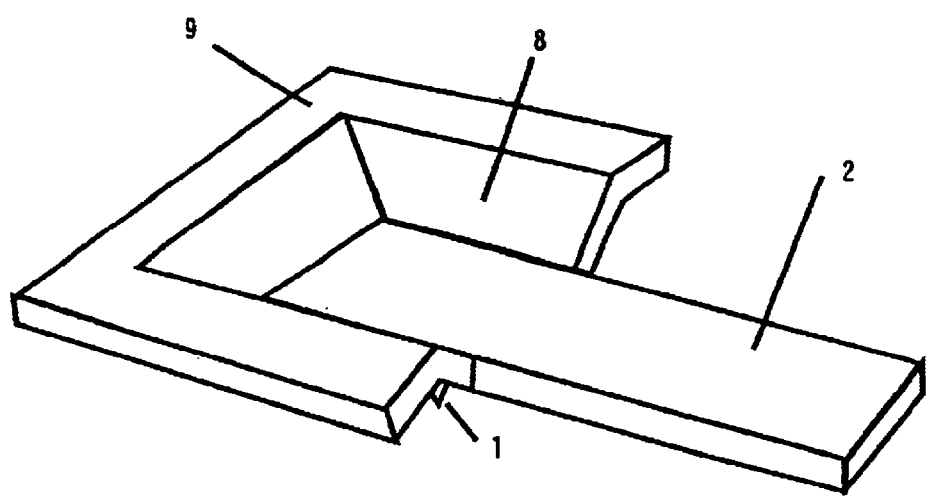
FIG. 12 is a perspective view of a tip portion of a near-field optical probe according to the third embodiment of the invention.

Accordingly, the near-field optical probe 3000 of the invention can increase the length of the shade region longer by a length L3 than in the near-field optical probe 1000. Also, it is needless to say that the shade region can be further extended by adding a slant portion 7 explained in Embodiment 2 of the invention to a tip of the penthouse portion 9. A spacing D between the lever 2 and the penthouse portion 9 is 1–1000 μm. The structural elements other than the connecting portion 8 and penthouse portion 9 are similar to the near-field optical probe 1000 in each dimension. FIGS. 11 and 12 are perspective views of a tip 1 portion of the near-field optical probe 3000. The penthouse portion 9 of the near-field optical probe 3000 may be provided only in a tip direction of the lever 2 as shown in FIG. 11, or may be provided in a manner surrounding around the tip 1 as shown in FIG. 12. According to the shape shown in FIG. 12, leak light in a lateral direction of the lever 2 can be efficiently shaded as compared to the shape of FIG. 11.

As stated above, according to the third embodiment of the invention, the near-field optical probe 3000 can extend the shade region greater than the second embodiment of the invention, making possible to obtain an optical image high in S/N ratio. Also, the shade region can be extended furthermore by applying the slant portion 7 to the near-field optical probe 3000.

FIG. 13 to FIG. 15 are a view explaining a manufacturing method for a near-field optical probe 3000 of the present Embodiment 3. Incidentally, hereinafter the above of the figure is referred to as a main surface and the below of the figure as a back surface.

Figure 13A:
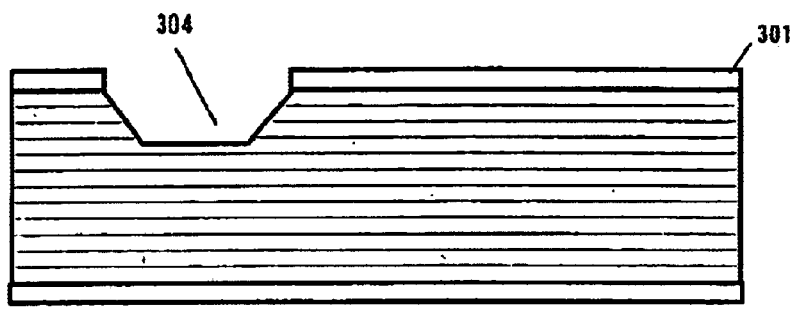
FIGS. 13A–13C are a process view (1) showing a manufacturing method for a near-field optical probe according to the third embodiment of the invention.

First, as shown in FIG. 13A, a mask 301 formed on a substrate 302 is formed to form a recess 304 in the substrate 302 by crystal anisotropic etching with TMAH or KOH, isotropic etching with an etchant including a mixture solution of fluoride hydroxide and nitric acid, isotropic dry etching using a reactive gas including $SF_6$ or the like. A mask material 303 is previously formed on the back surface of the substrate 302. The mask 301 uses a dielectric such as silicon dioxide, silicon nitride or photoresist, or a metal such as aluminum or chromium. Also, the substrate 302 uses a dielectric such as silicon or glass, or a metal such as aluminum or iron. The mask material 303 uses a dielectric such as silicon dioxide or silicon nitride. The depth of the recess 304 is almost the same as a height D of the connecting portion 8.

Figure 13B:
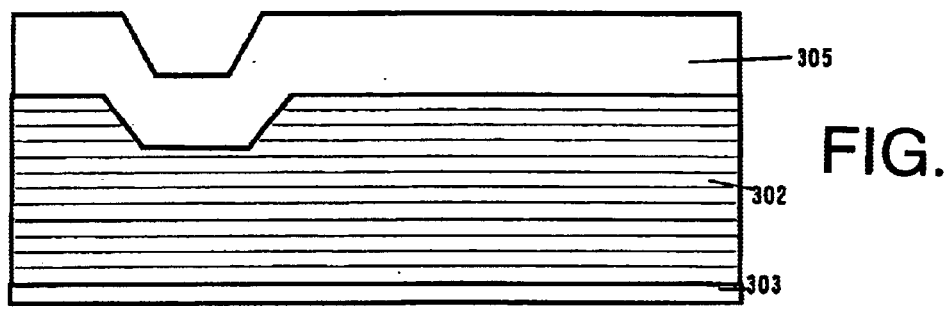

Next, the mask 301 is stripped off, and a transparent member 305 is formed by plasma CVD or sputter on the substrate 302 as shown in FIG. 13B. The thickness of the transparent member 305 is a sum of a height of a tip 1 and a thickness of a lever 2 for a near-field optical probe 3000.

Figure 13C:
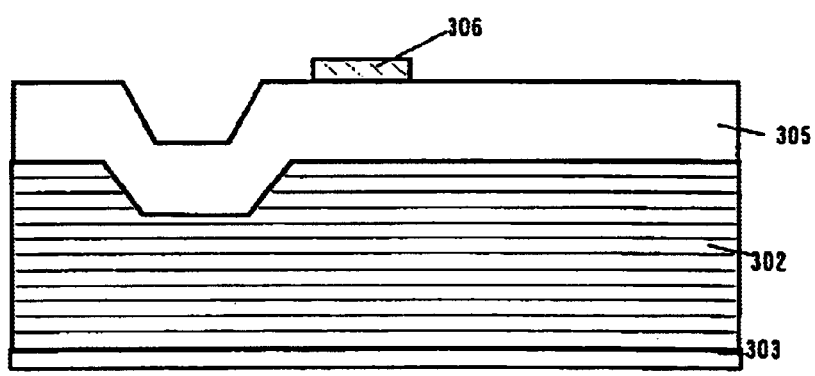

Next, as shown in FIG. 13C, photolithography is used to form a mask 306 for a tip on the transparent member 305. The mask 306 for a tip uses a dielectric such as photoresist or silicon nitride.

Figure 14A:
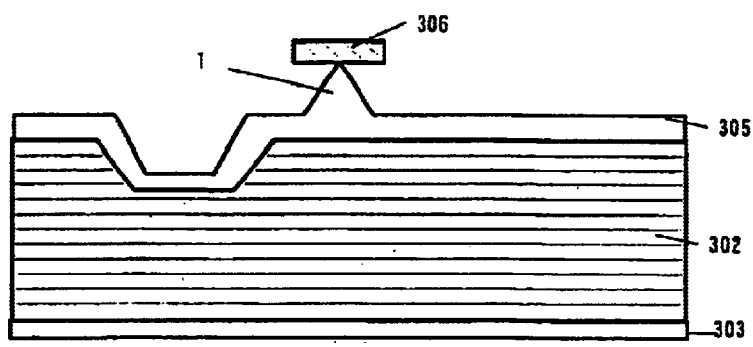
FIGS. 14A–14C are a process view (2) showing a manufacturing method for a near-field optical probe according to the third embodiment of the invention.
Figure 14B:
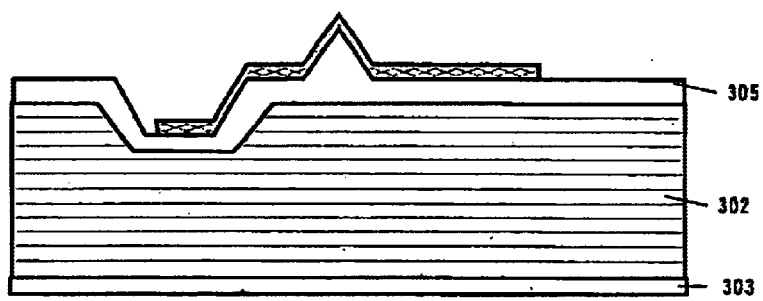
Figure 14C:
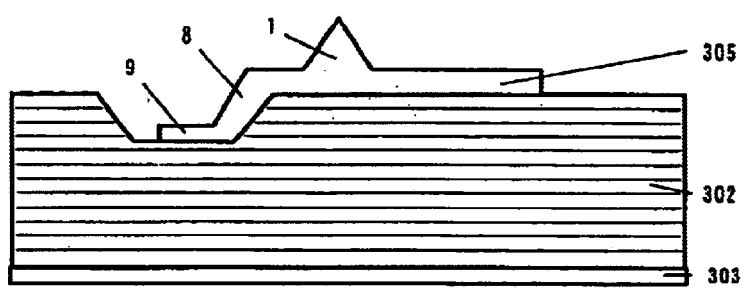

Next, a tip 1 and lever 2 is formed as shown in FIG. 14A to FIG. 14C, in a similar way to the method explained in FIG. 4C to FIG. 5B of the Embodiment 1. A connecting portion 8 and penthouse portion 9 is formed simultaneous with formation of a lever 2.

Figure 15A:
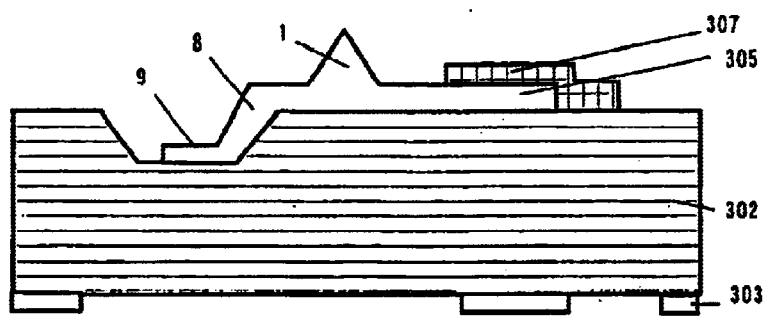
FIGS. 15A–15C are a process view (3) showing a manufacturing method for a near-field optical probe according to the third embodiment of the invention.

Next, a releasing mask 307 is formed on the main surface as shown in FIG. 15A in order to release the lever 2, connecting portion 8 and penthouse portion 9. The releasing mask 307 is of silicon nitride or silicon dioxide that are deposited by plasma CVD or sputter and patterned by photolithography. Also, the mask material 303 on the back surface is patterned by photolithography.

Figure 15B:
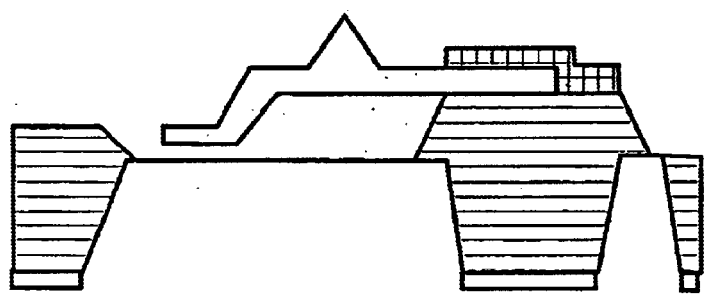

Next, the lever 2, connecting portion 8 and penthouse 9 are released by crystal anisotropic etching with TMAH or KOH as shown in FIG. 15B, wherein a base 3 is simultaneously formed.

Figure 15C:
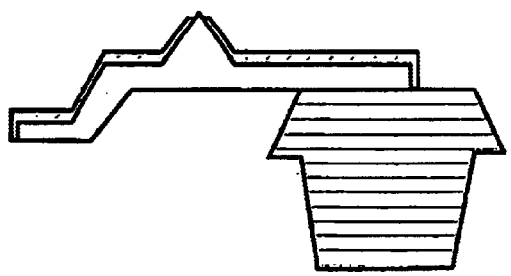
Figure 16:
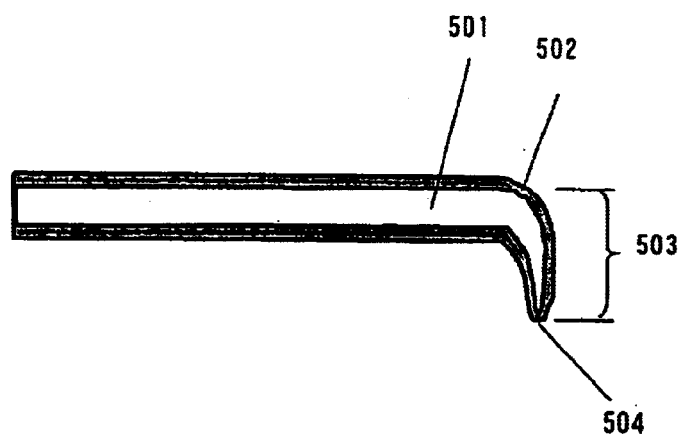
FIG. 16 is a structural view of a conventional optical fiber probe.
Figure 17:
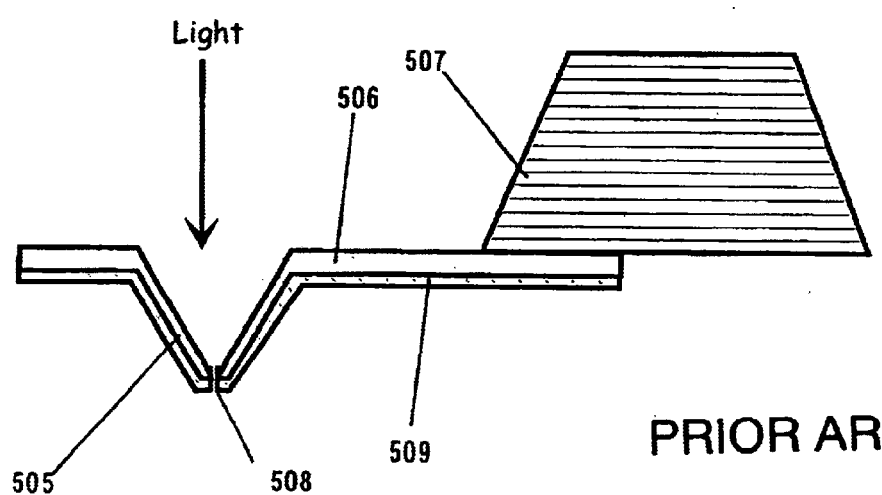
FIG. 17 is a structural view of a conventional SNOM probe.

Finally, the releasing mask 307 is removed away. A shade film 4 is formed on the main surface and a microscopic aperture 5 is formed in an end of the tip 1. By taking out of the wafer, a near-field optical probe 3000 shown in FIG. 15C is obtained. Meanwhile, in this process, a near field optical probe 3000 with a similar effect can be obtained even if the releasing mask 307 is not removed.

Meanwhile, in the process of forming a lever 2, connecting portion 8 and penthouse portion 9 explained in FIG. 14B to FIG. 14C, by using isotropic etching due to wet etching or dry etching including fluoride hydroxide, a near-field optical probe 3000 can be obtained that has a slant portion 7 at a tip of the penthouse portion 9.

By the manufacturing method explained above, a near-field optical probe 3000 of Embodiment 3 can be obtained. Because this manufacturing method uses a silicon process to form a near-field optical probe, it is possible to obtain scanning probes 3000 even in performance can be on a mass production basis. Accordingly, inexpensive near-field optical probes 3000 provided.

Meanwhile, by providing a weight such as a penthouse portion 9 and connecting portion 8 at the tip of the lever 2, the resonant frequency of the near-field optical probe 3000 is lowered than a resonant frequency of the near-field optical probe 1000 or near-field optical probe 2000. In the scanning near-field microscope in a dynamic force mode, synchronization is made between the resonant frequency of the near-field optical probe and the frequency of incident-light intensity modulation to detect a modulation signal by a lock-in amplifier, thus improving the S/N ratio in optical images. However, generally as the frequency of a modulation signal increases the noise in the optical image signal increases and S/N ratio decreases. Consequently, according to the near-field optical probe 3000 low in resonant frequency, an optical image high in S/N ratio can be obtained.

(Embodiment 4)

Although FIG. 3 shows an example of a basic structure functioning as a microscope by the use of the near-field optical probe 1000, a near-field optical apparatus can be provided to enable forming and measurement by producing near-field light with high intensity from the microscopic aperture. In order to produce near-field light high in optical intensity from the microscopic aperture 5 of the near-field optical probe 1000, there is a need to introduce light high in optical density to the microscopic aperture.

Figure 18:
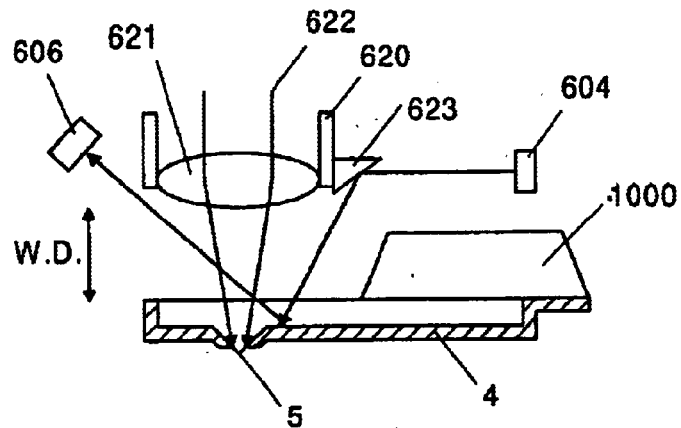
FIG. 18 is a structural view of a part of a near-field optical apparatus using the near-field optical probe according to the fourth embodiment of the invention.

FIG. 18 shows a structural view of a part of a near-field optical apparatus using a near-field optical probe according to a fourth embodiment of the invention. This is basically the same as the structure of the scanning probe microscope 20000 shown in FIG. 3, and the same points are omitted of illustration and explanation. The light 622 from a light source (not shown) is focused to the microscopic aperture 5 by a focus lens 621 held in a barrel 620. Herein, as the greater the numerical aperture (NA) of a focus lens 621 is used, light in more quantity can be focused to the microscopic aperture 5 hence making possible to produce near-field light higher in optical intensity. However, with a focus lens 621 great in NA, working distance (WD) is short. As shown in FIG. 3, in a method for detecting lever deflection or amplitude change using so-called an optical lever method, where WD is short, there is less space above the near-field optical probe 1000. Due to this, interference occurs between the optical-lever structural members and optical paths and the focus lens 621 and barrel 620 making difficult to employ a focus lens 621 great in NA.

In the optical lever method for example, the light emitted from a laser oscillator 604 is bent by a mirror 623 and illuminated to the lever of the near-field optical probe 1000 so that reflection light thereupon is detected by vertically-two-divided photoelectric converting section 606. Here, the laser oscillator 604 and the photoelectric converting section 606 are nearly in the same plane as the lever of the near-field optical probe 1000. A mirror 623 used for optical-path bending in an optical lever is attached in the barrel 620, and the focus lens 621 and the mirror 623 are integrated to reduce size and omit space. This makes it possible to use a focus lens 621 great in NA without encountering the interference of the optical path for the optical lever and members, and the focus lens 621 and barrel 620.

Figure 19:
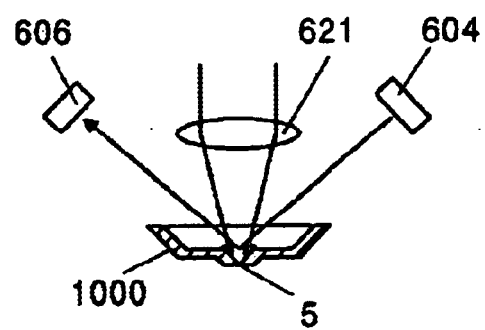
FIG. 19 is a structural view of a part of a near-field optical apparatus using the near-field optical probe according to the fourth embodiment of the invention.

Furthermore, another structural example is shown. FIG. 19 shows a structural view of a part of a near-field optical apparatus using the near-field optical probe according to the fourth embodiment of the invention. Shown is a structure in a vertical section relative to the lever of the near-field optical probe 1000. Here, the laser oscillator 604 and the photoelectric converting section 606 are arranged in a nearly vertical plane to the lever of the near-field optical probe 1000. With such an arrangement, the laser oscillator 604 and the photoelectric converting section 606 can be approached to a sample surface to reflect the light at a great incident angle with respect to the lever from the laser oscillator 604 without causing interference to the near-field optical probe 1000 or its holder. Even with such a structure, it is possible to detect lever deflection or vibration amplitude change similarly to the conventional. No interference occurs between the optical path and the focus lens 621 making possible to use the focus lens 621 great in NA.

Figure 20:
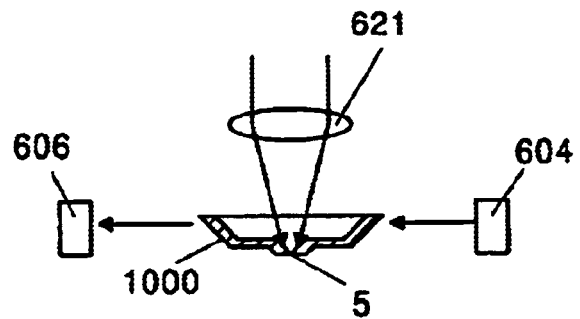
FIG. 20 is a structural view of a part of a near-field optical apparatus using the near-field optical probe according to the fourth embodiment of the invention.

Furthermore, as another structural example, FIG. 20 shows a structural view of a part of a near-field optical apparatus using the near-field optical probe according to the fourth embodiment of the invention. This has a laser oscillator 604 and photoelectric converting section 606 arranged in a nearly vertical plane to the lever of the near-field optical probe 1000, similarly to FIG. 19. Herein, the light from the laser oscillator 604 is not reflected by the lever but passed through the lever so that diffraction light thereof is detected in the photoelectric converting section 606. Even with this structure, lever deflection and vibration amplitude change can be detected similarly to the conventional. Accordingly, it is possible to obtain an effect similar to FIG. 19.

Figure 21:
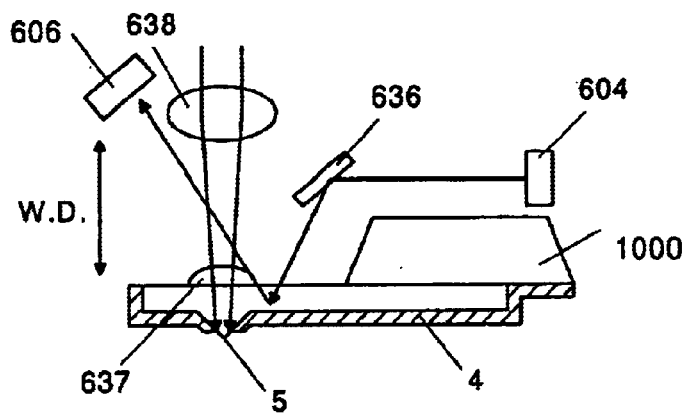
FIG. 21 is a structural view of a part of a near-field optical apparatus using the near-field optical probe according to the fourth embodiment of the invention.

Furthermore, as another structural example, FIG. 21 shows a structural view of a part of a near-field optical apparatus using the near-field optical probe according to the fourth embodiment of the invention. Herein, a near-field optical probe 1000 is used forming a lens 637 on the tip. By using this near-field optical probe 1000, even if the NA of the focus lens 638 is small, it is possible to increase the NA as a combined lens system comprising the focus lens 638 and a lens 637. Accordingly, even if using the focus lens 638 long in WD and the usual optical lever structure, light can be focused to the microscopic aperture 5 to emit intense near-field light from the microscopic aperture 5.

By the embodiment shown above, a near-field optical apparatus can be provided to conduct forming or precise measurement by illuminating light with high optical density to the microscopic aperture 5 and thereby using intense near-field light.

(Embodiment 5)

Figure 22:
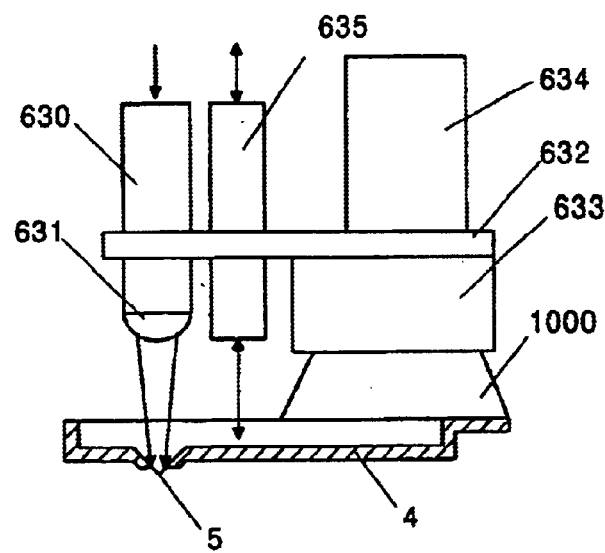
FIG. 22 is a structural view of a part of a near-field optical apparatus using the near-field optical probe according to a fifth embodiment of the invention.

FIG. 22 shows a structural view of a part of a near-field optical apparatus using a near-field optical probe according to a fifth embodiment of the invention. This is basically the same as the structure of the scanning probe microscope 20000 shown in FIG. 3, and same points are omitted of illustration and explanation. The light from a light source (not shown) is propagated by an introducing fiber 630 formed by an optical fiber to a vicinity of the near-field optical probe 1000, and focused by a lens 631 provided at a tip of the introducing fiber 630 to the microscopic aperture 5. The introducing fiber 630 having the lens 631 at the tip can be easily fabricated by grinding a tip of a usual optical fiber. With this structure, because the light focused to the microscopic aperture 5 can be introduced, intense near-field light can be emitted from the microscopic aperture 5. Furthermore, because of using the introducing fiber 630 and the lens 631, it is possible to make a microscope objective lens compact and light in weight. Due to this, it is needless to say that, even where using a usual optical-lever structure, lever deflection and vibration amplitude change can be detected without causing interference in the members and optical paths.

In this embodiment, furthermore the near-field optical probe 1000 and the introducing fiber 630 are integrated using a fiber holder 632 and probe holder 633 and finely moved by a fine-movement mechanism 634. Because the near-field optical probe 1000 and the introducing fiber 630 are both small in size and light in weigh, in spite of integration high-speed movement is possible by the fine-movement mechanism 634. In order to detect lever deflection or vibration amplitude change in the near-field optical probe 1000, an interference detecting fiber 635 held by a fiber holder 632 is used for reducing size and weight. The interference detecting fiber 635 is a usual optical fiber, the interference detecting fiber 635 at an emission end is held in a vicinity of the lever. The light from the emission end of the interference detecting fiber 635 reflects upon a reflection surface of the lever and again returns to the interference detecting fiber 635. By detecting a change in return-light intensity at the other end of the interference detecting fiber 635, it is possible to detect lever deflection or vibration amplitude change.

By providing a structure as in this embodiment, the reduction in size and weight is possible through integrating the near-field optical probe 1000, the light introducing optical system to the microscopic aperture 5, the lever displacement detecting system and the like. Consequently, the near-field optical probe 1000 can be finely vibrated in a state of intensifying the near-field light from the microscopic aperture 5. Accordingly, it is possible to cope with a sample with a large area and high-speed scanning. Although this embodiment used the interference detecting fiber 635, it is needless to say that the reduction in size and weight is also possible for example by using an electrostatic capacitance sensor providing a similar effect.

It is understood that the content stated in Embodiment 4 and Embodiment 5 not only facilitates the use of a focus lens with a great NA without using an optical lever method where the near-field optical probe 1000 has a detecting function for lever deflection and vibration amplitude but also is desirable because of its capability of further reducing size and weight. For example, lever deflection detection is made possible by layering piezoelectric thin films on the lever.

(Embodiment 6)

Figure 23:
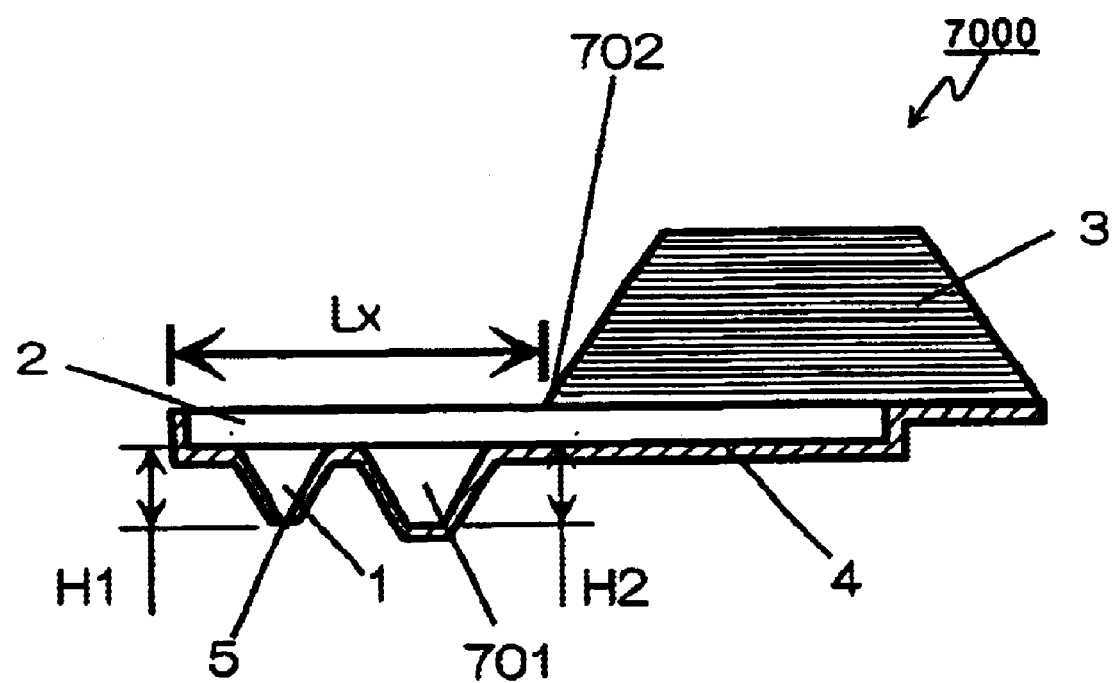
FIG. 23 is a structural view of a near-field optical probe according to a sixth embodiment of the invention.

FIG. 23 is a schematic view of a near-field optical probe 7000 according to Embodiment 6, which can be used to be mounted on the scanning probe microscope 20000. Explanation will be made by using the same reference numerals to the same points of the near-field optical probe 1000 shown in FIG. 1. The near-field optical probe 7000 comprises a structure having a convex weight portion 701 added to the near-field optical probe 1000 shown in FIG. 1. The weight portion 701 is formed. on the lever 2 between a tip 1 and a fixed end 702 of the lever 2 with respect to the length Lx direction of the lever 2. The weight portion 701 has a height H2 equal to or lower than a height H1 of the tip 1. Incidentally, the weight portion 701 may be similarly formed on the near-field optical probe 2000 or near-field optical probe 3000. The near-field optical probe 7000 is in proximity to a sample in a state inclined by a certain angle θ1 similarly to the near-field optical probe 1000 shown in FIG. 2. Consequently, when the tip 1 at an end is proximity to the sample, the weight portion 701 will not interfere with the sample. The material of the weight portion 701 is the same as the tip 1.

Figure 24A:
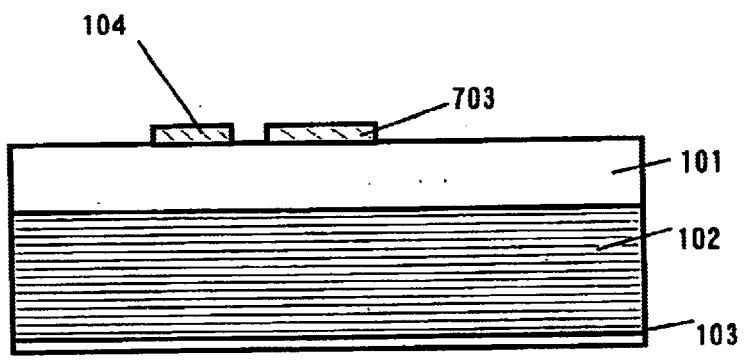
FIGS. 24A–24B are a view for explaining a manufacturing method for a near-field optical probe according to the sixth embodiment of the invention.
Figure 24B:
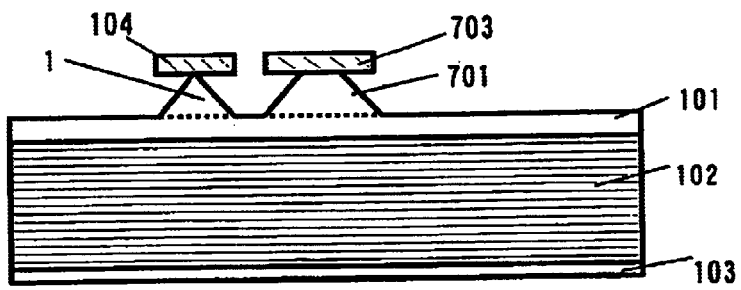

A manufacturing method for a near-field optical probe 7000 according to the present embodiment is almost similar to the manufacturing method for a near-field optical probe 1000 stated above. FIG. 24A is a figure corresponding to the process explained in FIG. 4B. In the manufacturing method for a near-field optical probe 7000 of this embodiment, a mask 703 for forming a weight portion 701 is formed simultaneously with a mask 104 for tip, as shown in FIG. 24A. Thereafter, as shown in FIG. 24B, a tip 1 and weight portion 701 is formed by wet etching or dry etching. The process after that is the same as FIG. 4D and the subsequent. As explained above, according to the manufacturing method for a near-field optical probe of the invention, a weight portion 701 can be formed without impediment to mass producibility. Also, in also other manufacturing methods for a near-field optical probe, a weight portion 701 can be formed by merely forming a mask 104 for a tip and a mask for forming a weight portion 701 at the same time. Also, by simultaneously etching the same transparent film to form a tip 1 and a weight portion 701, the height H2 of the weight portion 701 is facilitated formed equal to or lower than a height H1 of the tip 1.

The shape of the lever 2 for a near-field optical probe 7000 is similar to the near-field optical probe 1000 or near-field optical probe 2000. However, because the weight portion 701 is formed closer to the tip 1 than the lever 2 fixed end 702 on the lever 2 for the near-field optical probe 7000, the resonant frequency of the near-field optical probe 7000 is lower than the near-field optical probe 1000, the near-field optical probe 2000 or near-field optical probe 3000. Accordingly, as described in Embodiment 3, the S/N ratio in the optical image can be improved according to the near-field optical probe 7000 low in resonant frequency.

Furthermore, according to the near-field optical probe 7000 formed with the weight portion 701 on the lever 2, because the portion forming the weight portion 701 on the lever 2 has a great thickness, spring constant is increased than the near-field optical probe 1000, the near-field optical probe 2000 or the near-field optical probe 3000. The near-field optical probe 7000 great in spring constant can be reduced in affection of air damping caused by providing the shade region and obtain an operation characteristic more stable than the near-field optical probe 1000, the near-field optical probe 2000 or the near-field optical probe 3000.

(Embodiment 7)

Figure 25:
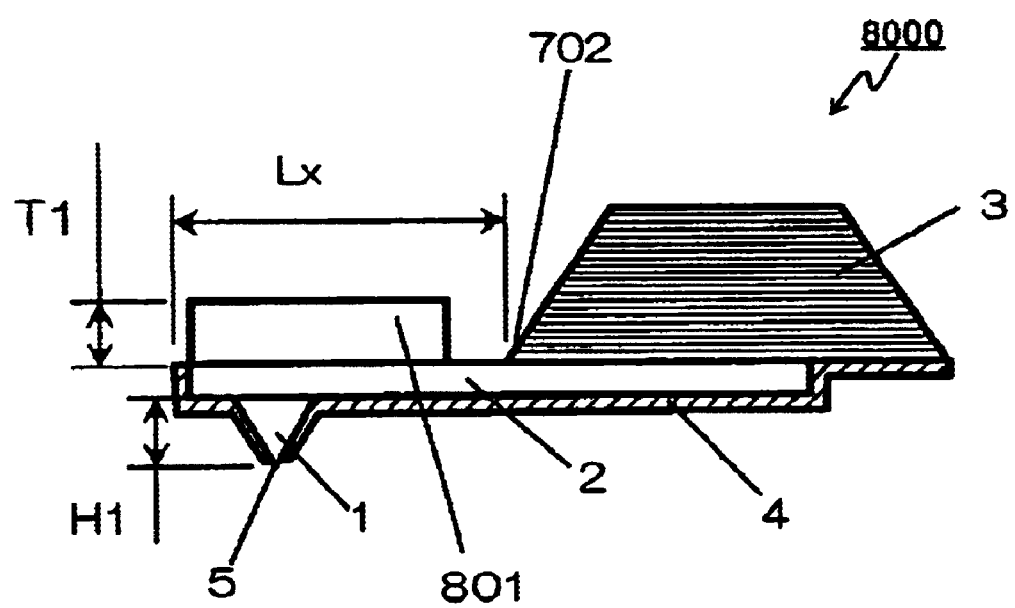
FIG. 25 is a structural view of a near-field optical probe according to a seventh embodiment of the invention.

A near-field optical probe 800 according to Embodiment 7 of the invention is shown in FIG. 25. The near-field optical probe 8000 according to Embodiment 7 can be used mounted on the scanning probe microscope 20000. Explanation is made using the same reference numerals to the same points of the near-field optical probe 7000 shown in FIG. 23. The near-field optical probe 8000 is formed with a weight portion 801 on an opposite side to a surface forming a tip 1 of a lever 2. The weight portion 801 is formed closer to a free end than a fixed end 702 of the lever 2. The thickness T1 of the weight portion 801 is 500 μm to several tens μm. Also, the length of the weight portion 801 is shorter than a length Lx of the lever 2, and the width of the weight portion 801 is narrower than a width of the lever 2. The material of the weight portion 801 may be the same as the lever 2 and tip 1, or another material. Incidentally, the weight portion 801 may be formed on the near-field optical probe 2000, the near-field optical probe 3000 and the near-field optical probe 7000.

According to the near-field optical probe 8000 according to Embodiment 7 of the invention, because the weight portion 801 is formed on an opposite side to the side forming the tip 1, there is an effect in addition to the effect explained in Embodiment 6 of the invention that the weight portion 801 will not interfere with a sample even where observing a sample with a high rise.

A manufacturing method for a near-field optical probe 8000 of the present embodiment will be explained using FIG. 26. Incidentally, explanation is made using the same reference numerals to the same points in the manufacturing method for a near-field optical probe 1000 shown in FIG. 4 to FIG. 5.

Figure 26A:
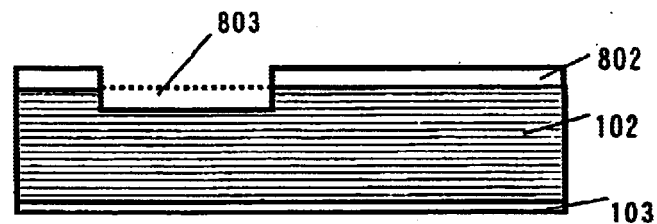
FIG. 26A–26D are a view for explaining a manufacturing method for a near-field optical probe according to a seventh embodiment of the invention.

First, as shown in FIG. 26A, a mask 802 for forming a step is formed on a substrate 102, and a step 803 is formed on the substrate 102 by wet etching or dry etching. The depth of the step 803 is the same as the thickness T1 of the weight portion 801.

Figure 26B:
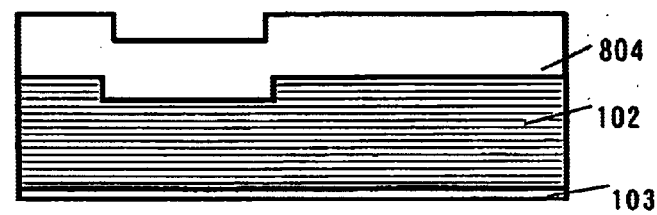

Next, the mask 802 for forming a step is removed to deposit a material 804 for a weight portion on the substrate 102 formed with a step 803, as shown in FIG. 26B. The thickness of the material 804 for a weight portion is greater than a depth of the step 803. The material of the material 804 for a weight portion is the same as a material of the weight portion 801.

Figure 26C:
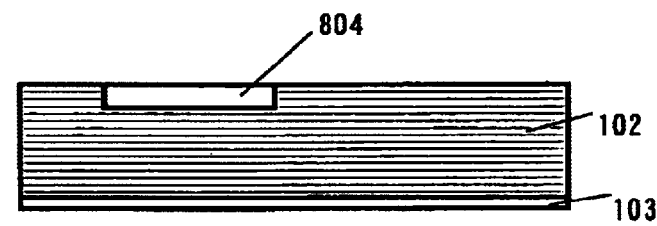

Next, the material 804 for a weight portion is removed by a method, such as polishing or etch back, to form a form having the material 804 for a weight portion buried in the substrate 102, as shown in FIG. 26C.

Figure 26D:
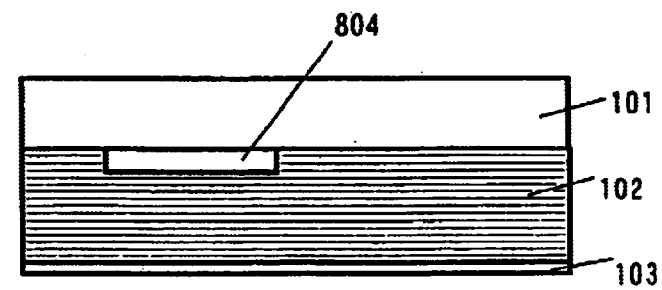
Figure 27:
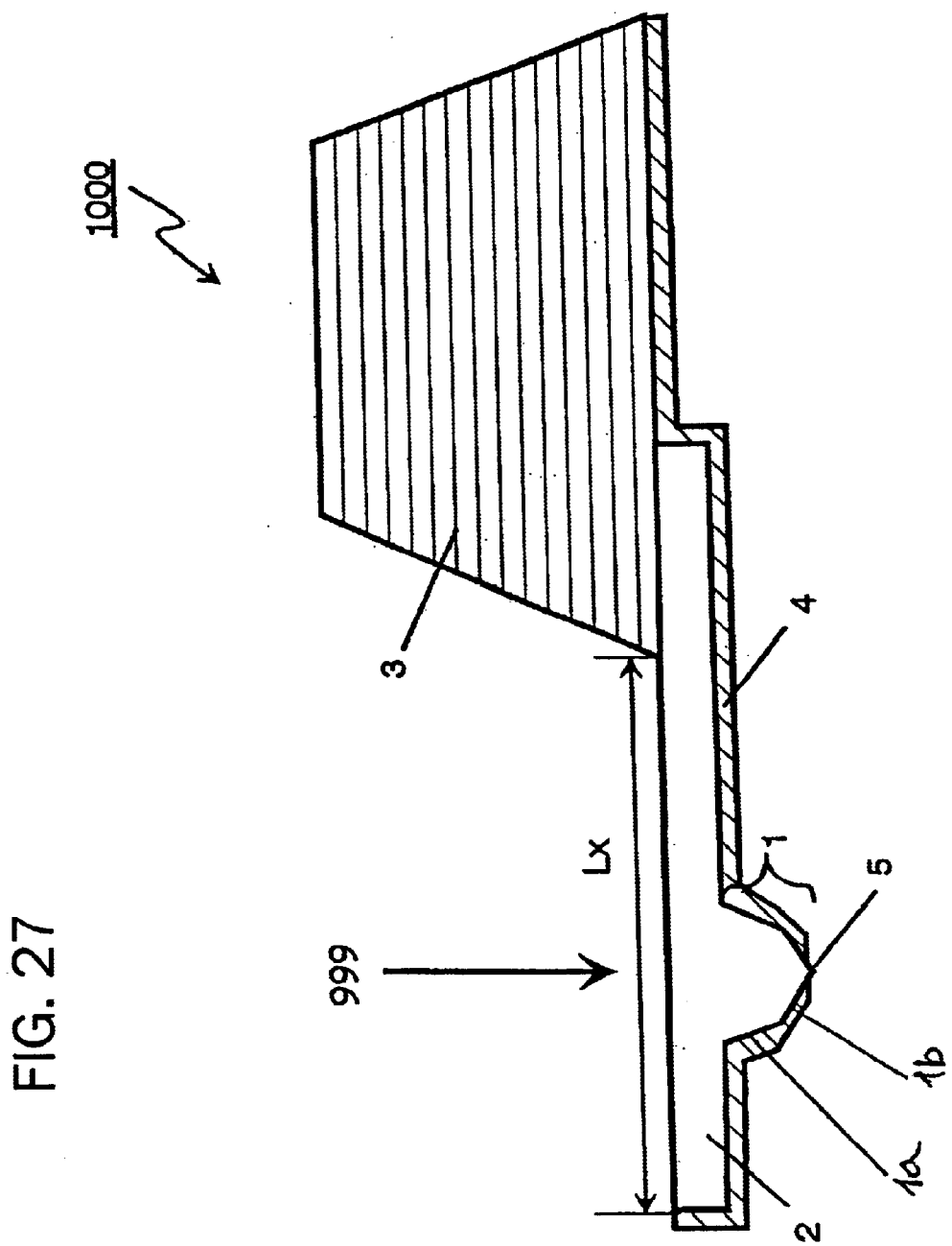
FIG. 27 shows a near-field optical probe according to an eighth embodiment of the invention.

Next, as shown in FIG. 26D, a transparent member 101 is deposited. The process subsequent to this is the same as the manufacturing method for a near-field optical probe 1000 explained in Embodiment 1 except in that the material 804 for a weight portion is buried in the substrate 102, and hence omitted of explanation.

As explained above, according to the manufacturing method for a near-field optical probe 8000 of the present embodiment, it is possible to fabricate near-field optical probes 8000 by a batch process. Accordingly, inexpensive near-field optical probes 8000 can be provided on a mass production basis.

As explained above, according to the first embodiment of the invention, there is no possibility that foreign matter intrudes in the microscopic aperture because of the structure that the upper portion of the microscopic aperture is filled by a transparent member. Consequently, the near field light caused from the near-field optical probe is stabilized in intensity. Also, the tip is improved in impact-resistance and wear-resistance due to the tip filled with a transparent material for a wavelength of the incident light or/and the detection light. Also, because the material constituting the tip has refractivity greater than air, the light propagating in the tip is shortened in wavelength than in air. Consequently, because the amount of the light transmitted through the microscopic aperture increases than in the case of propagation in air and transmission through the microscopic aperture, it is possible to enhance the intensity of the near-field light illuminated from the microscopic aperture. Also, by forming the tip by diamond, the tip is improved in wear-resistance, furthermore, it is possible to enhance the intensity of the near-field light illuminated from the microscopic aperture because of high refractivity. Also, where the end of the tip is structured to protrude with respect to an end surface of the shade film, because the radius at the end of the tip is small, the scanning probe microscope can be improved in resolution of concave-convex images or optical images. Furthermore, where the end of the tip is structured to protrude with respect to the end face of the shade film, because of coincidence between the tip end and the center position of the microscopic aperture, the deviation of a concave-convex image and an optical image is very small. Also, where the near-field optical probe has L1 satisfying Equation (4), because the tip at its end can proximate the sample and completely shade leak light other than incident light or/and detection light, an concave-convex image and optical image can be stably obtained. Also, even if the lens NA for incidence of light onto the near-field optical probe or/and for detection of light from the near-field optical probe is increased, there is no kick of incident light on the tip or/and detection light from the tip because the lever is a transparent member so that the incident light can be efficiently guided to the microscopic aperture or/and detection light can be detected from the microscopic aperture thereby making possible to increase producing efficiency of near-field light for illumination from the microscopic aperture and/or detecting efficiency in the microscopic aperture. Also, the near-field optical probe for producing near-field light from the microscopic aperture through propagation through the lever and tip as a transparent member or/and detecting optical information of samples in the microscopic aperture is wide in a wavelength region having high transmissivity relative to an incident light wavelength. Accordingly, the scanning probe microscope can be used in the application field such as spectroscopic analysis. Also, because of capability of producing near-field light great in intensity, it is possible to illuminate near-field light having required energy for photolithography, photo-molding, optical CVD and thermal forming, use the scanning probe microscope as an optical forming apparatus, and observe simultaneously a forming shape by the use of the near-field optical probe high in concave-convex image resolution. The scanning probe microscope as a spectroscopic analysis or forming apparatus can shorten the time required for analysis or forming because the near-field light produced from the near-field optical probe is high in intensity. Or /and detecting efficiency of optical information in the microscopic aperture is high Also, by making the near-field optical probe with a multi-cantilever, it is possible to analyze or form over a large area in a brief time.

According to the manufacturing method for a near-field optical probe according to Embodiment 1 of the invention, a near-field optical probe can be manufactured. Also, because the manufacturing method explained uses a silicon process, it is possible to manufacture near-field optical probes on a large scale basis and with high reproducibility. Accordingly, the near-field optical probe can be provided at low cost. Also, because the lever is easy to reduce the size, it is possible to increase the resonant frequency of the lever of the near-field optical probe and, at the same time, decrease the spring constant. Consequently, in the scanning probe microscope, distance control can be stably made between an end of the tip and a sample, and wherein the end of the tip and the sample can be prevented from being damaged. Furthermore, scanning velocity in the scanning prob microscope can be increased.

Also, by controlling the adhesion between the transparent member and the mask for a tip, an arbitrary end angle can be obtained for the tip. Accordingly, by increasing an end angle of the tip .end, the near-field light illuminated or/and detected from the microscopic aperture can be increased in intensity. Also, in another embodiment, a tip having a plurality of surfaces with different taper angles is obtainable by conducting the tip-forming process a plurality of number of times. Consequently, by decreasing the end angle of the tip and increasing the taper angle to a middle portion of the tip, it is possible to provide a near-field optical probe satisfying at the same time the high resolution for concave-convex images and optical images and the high producing efficiency of near-field light. Also, the tip can be made into a shape of circular cone or arbitrary polygonal cone by providing the tip mask with a circular or polygonal shape as viewed, from the above in FIG. 4B, where the tip is in a circular cone, and the microscopic aperture is circular in shape whereby near-field light having an arbitrary polarization characteristic can be illuminated from the microscopic aperture by controlling the polarization characteristic of the light incident on the near-field optical probe. Also, where the tip is in a polygonal cone shape, the microscopic aperture is given a polygonal shape enabling illumination of light having a magnitude great in a particular polarization direction to a sample.

Also, a near-field optical probe having a lens on the tip can be obtained by forming a Fresnel lens pattern on the substrate to form a tip 1 on a Fresnel-lens pattern, forming a portion having a refractivity distribution in a transparent member in portion having a refractivity distribution in a transparent member in a portion for forming a tip upon deposition of a transparent member, or forming a lens-formed recessing a portion of the substrate for forming a tip to deposit a transparent member. Accordingly, the near- field light produced from the microscopic aperture can be increased in intensity. Also, according to the manufacturing method for a near-field optical probe, it is easy to form, on the base, a multi-cantilever having a plurality of levers, tips and microscopic apertures. According to the multi-cantilever, because a plurality of tips and microscopic apertures can be simultaneously scanned, observation over a large area is possible at high velocity. Also, according to the manufacture method for a near-field optical probe, because a sensor of a piezoelectric or static capacitance type to be fabricated by a similar manufacturing method can be easily integrated on the lever, deflection of the lever can be detected without using an optical lever. Also, deflection of the lever can be detected by structuring the lever by a piezoelectric member including of quartz and forming an electrode. Furthermore, where the lever is structured of quartz, it is also possible to detect deflection in the lever and/or apply vibration to the lever.

Also, according to the second embodiment or/and the detecting means from the near-field optical probe, the shade region can be broadened greater than the first embodiment of the invention. Because of reduction in affection of leak light due to reflection upon a cantilever surface, an optical image with high S/N ratio is to be obtained. Also, by broadening the shade region for the near-field optical probe, it is possible in the scanning probe microscope to obtain an optical image without suffering from affection of leak light even if a spacing is increased between the optical fiber and the lever. Furthermore, where the light incidence means on the near-field optical probe for the scanning probe microscope collects light only by a lens, it is possible to obtain an optical image with high S/N ratio without suffered from leak light even if the lens NA is small. Meanwhile, because generally as the lens NA is smaller the longer the lens focal distance and the deeper the lens focal depth become, making possible to increase the spacing between the near-field probe and the lens. Accordingly, position aligning of the near-field optical probe is facilitated thus simplifying operation of the scanning probe microscope.

Also, according to the manufacturing method explained in the second embodiment of the invention, a near-field optical probe 2000 of the second embodiment of the invention can be easily manufactured, obtaining a similar effect to the manufacturing method explained in the first embodiment. Also according to the manufacturing method for a near-field optical probe of the second embodiment, because the formation of a shade film on a slant portion is easier than the formation of a shade film on the lever side surface of the near-field optical probe of the first embodiment, shield of light is facilitated for the lever side surface of the near-field optical probe of the second embodiment.

Also, according to the third embodiment of the invention, the near-field optical probe can broaden the shade region than the second embodiment of the invention, obtaining optical images high in S/N ratio. Also, the shade region can be broadened furthermore by applying the slant portion explained in the second embodiment to the near-field optical probe of the third embodiment.

Also, according to the manufacturing method according to the third embodiment of the invention, it is possible to obtain a near-field optical probe explained in the third embodiment. Furthermore, because of manufacture using a silicon process, near-field optical probes even in performance can be obtained on a mass production basis. Accordingly, inexpensive near-field optical probes can be provided.

Also, according to the third embodiment of the invention, by providing a weight such as a penthouse portion and connecting portion at a tip of the lever, it is possible to lower the near-field optical probe resonant frequency and acquire an optical image good in S/N ratio.

Also, according to the fourth embodiment, because lever deflection and vibration amplitude change can be detected by using an optical lever method or the similar method and a focus lens with great NA can be used, optically dense light can be introduced to the microscopic aperture making possible to increase the intensity of near-field light emitted from the microscopic aperture. Accordingly, the near-field optical apparatus of the invention can be used to applications of measurement or forming with high S/N ratio besides as a microscope used in observation.

Also, according to the fifth embodiment of the invention, because it is possible to reduce the size and the weight of the optical introduction system to the microscopic aperture or the change detection system for lever deflection or vibration amplitude, integrating the near-field optical probe with them and providing fine movement at high speed. Accordingly, it is possible to observe and measure a large-area sample by using the near-field optical probe and scan the near-field optical probe at high speed.

According to the sixth embodiment of the invention, a near-field optical probe can be obtained which is low in resonant frequency and great in spring constant, improving optical-image S/N ratio and obtaining stable operation characteristic reduced in affection of air damping. Also, according to the manufacturing method according to the sixth embodiment of the invention, a near-field optical probe can be obtained which was explained in the sixth embodiment. Because of capability of being manufactured in a batch process, it is possible to provide near-field optical probes inexpensive and even in performance. Also, by simultaneous etching a same transparent film to form a tip and a weight portion, the height of the weight portion can be easily formed equal to or lower than a height of the tip.

Also, according to the seventh embodiment of the invention, because the weight on the cantilever is formed on a side opposite to a side forming the tip, the weight will not contact a sample in observing a sample with a great rise in addition to the effect of the sixth embodiment of the invention. Accordingly, it is possible to stably observe a sample with great rise. Also, according to the manufacturing method according to the seventh embodiment, a near-field optical probe explained in the seventh embodiment can be obtained. Further, because of the capability of being manufactured by a batch process, a near-field optical probe can be provided inexpensive and even in performance.

What is claimed is:

1. A near-field optical probe comprising: a cantilever having a first main surface, a second main surface opposite the first main Surface, a fixed end, a free end opposite to the free end, and a convex portion disposed on the second main surface, the cantilever being disposed at an inclination angle θ1 relative to a surface of a sample; a base supporting the cantilever at the first main surface; a tip having a height H and extending from the second main surface of the cantilever and having a microscopic aperture at an end thereof, the convex portion of the cantilever being disposed at a position closer to the fixed end of the cantilever than to the tip, and a height of the tip being greater than a height of the convex portion; and a shade film formed on the second main surface of the cantilever and on a surface of the tip except for the microscopic aperture; wherein when a radius of a light spot on the cantilever resulting from light incident on the tip or light detected by the microscopic aperture and being incident on a detector is R1, a distance L1 from a center of the tip to a free end of the cantilever satisfies the equation $R1 < L1 < H/\tan \theta 1$.

2. A near-field optical apparatus comprising:
a cantilever formed of a transparent material and having a first main surface and a second main surface opposite the first main surface;
a base supporting the cantilever at the first main surface;
a tip extending from the second main surface of the cantilever and having a microscopic aperture at an end thereof, the tip being formed of a transparent material having a higher refractive index than that of the transparent material of the cantilever to increase an amount of near-field light generated or detected by the microscopic aperture;
a shade film formed on the second main, surface of the cantilever and on a surface of the tip except for the microscopic aperture;
an introducing/detecting optical system having a lens for introducing light to the microscopic aperture of the near-field optical probe or detecting light from the microscopic aperture of the near-field optical probe;
a detector for detecting a distance between the microscopic aperture of the near-field optical probe and a sample by an optical lever method, the detector having a mirror integral with the lens of the introducing/detecting optical system; and
a fine movement mechanism for finely moving the sample or the near-field optical probe.

3. A near-field optical apparatus according to claim 2 wherein the tip of the near-field optical probe is generally conical-shaped.

4. A near-field optical apparatus according to claim wherein the tip of the near-field optical probe is generally pyramidal-shaped.

5. A near-field optical apparatus comprising:
a cantilever formed of a transparent material and having a first main surface and a- second main surface opposite the first main surface;
a base supporting the cantilever at the first main surface;
a tip extending from the second main surface of the cantilever and having a microscopic aperture at and end thereof, the tip being formed of a transparent material having a higher refractive index than that of the transparent material of the cantilever to increase an amount of near-field light generated or detected by the microscopic aperture;
a shade film formed on the second main surface of the cantilever and on a surface of the tin except for the microscopic aperture;
an introducing/detecting optical system for introducing light to the microscopic aperture of the near-field optical probe or detecting light from the microscopic aperture of the near-field optical probe;
a detector for detecting a distance between the microscopic aperture of the near-field optical probe and a sample and for detecting an interference between the cantilever of the near-field optical probe and an optical fiber disposed close to the cantilever; and
a fine movement mechanism for finely moving the sample or the near-field optical probe.

6. A near-field optical apparatus according to claim 5; wherein the tip of the near-field optical probe is generally conical-shaped.

7. A near-field optical apparatus according to claim 5; wherein the tip of the near-field optical probe is generally pyramidal-shaped.

8. A method for manufacturing a near-field optical probe, comprising the steps of: forming a step portion on a substrate; providing a transparent member on a first main surface of the substrate; etching a part of the transparent member to form a tip in the vicinity of the step portion, forming a mask on the transparent member covering the tip and etching the transparent member using the mask to form a lever; etching the substrate from a second main surface opposite to the first main surface to form a base; and forming a shade film on the lever and on the tip except for an end portion of the tip.

9. A method for manufacturing a near-field optical probe, comprising the steps of: forming a step portion on a substrate; burying a weight material to be used as a weight portion in the step portion; providing a transparent member on a first main surface of the substrate; etching a part of the transparent member to form a tip; forming a mask on the transparent member covering the tip and etching the transparent member using the mask to form a lever; etching the substrate from a second main surface opposite to the first main surface to form a base; and forming a shade film on the lever and on the tip except for an end portion of the tip.

10. A method according to claim ; wherein the burying step comprises providing the weight material on the substrate to at least fill the step portion with the weight material, and removing part of the weight material on that a surface of the weight material provided in the step portion and a surface of the substrate are disposed in a single plane.

11. A method for according to claim 10; wherein the step of removing the weight material comprises polishing the weight material.

* * * * *